(12) United States Patent
Caire et al.

(10) Patent No.: US 8,705,484 B2
(45) Date of Patent: Apr. 22, 2014

(54) METHOD FOR VARYING TRANSMIT POWER PATTERNS IN A MULTI-CELL ENVIRONMENT

(75) Inventors: Giuseppe Caire, South Pasadena, CA (US); Haralabos Papadopoulos, San Jose, CA (US); Sean A. Ramprashad, Los Altos, CA (US); Christine Pepin, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 785 days.

(21) Appl. No.: 12/538,739

(22) Filed: Aug. 10, 2009

(65) Prior Publication Data
US 2010/0041408 A1    Feb. 18, 2010

Related U.S. Application Data

(60) Provisional application No. 61/089,096, filed on Aug. 15, 2008.

(51) Int. Cl.
*H04W 4/00*      (2009.01)
*H04W 40/00*     (2009.01)

(52) U.S. Cl.
USPC .......................................... 370/330; 455/446

(58) Field of Classification Search
USPC ............................ 370/330; 455/446, 522, 561
See application file for complete search history.

(56) References Cited

U.S. PATENT DOCUMENTS

| | | |
|---|---|---|
| 5,903,842 A | 5/1999 | Wang |
| 5,982,327 A | 11/1999 | Vook et al. |
| 6,182,264 B1 | 1/2001 | Ott |
| 6,629,287 B1 | 9/2003 | Brink |
| 6,804,307 B1 | 10/2004 | Popovic |
| 6,862,552 B2 | 3/2005 | Goldstein et al. |
| 6,901,117 B1 | 5/2005 | Classon et al. |
| 6,976,087 B1 | 12/2005 | Westfall et al. |
| 7,042,856 B2 | 5/2006 | Walton et al. |
| 7,042,858 B1 | 5/2006 | Ma et al. |
| 7,072,295 B1 | 7/2006 | Benson et al. |
| 7,095,812 B2 | 8/2006 | Chan et al. |

(Continued)

FOREIGN PATENT DOCUMENTS

| | | |
|---|---|---|
| EP | 1162750 A2 | 12/2001 |
| EP | 1383246 A2 | 1/2004 |

(Continued)

OTHER PUBLICATIONS

Marsch, Patrick, et al., On multicell cooperative transmission in backhaul-constrained cellular systems. Annals of Telecommunications, May 1, 2008, pp. 253-269, vol. 63, No. 5/6.

(Continued)

*Primary Examiner* — Afshawn Towfighi
(74) *Attorney, Agent, or Firm* — Balkely Sokoloff, Taylor & Zafman LLP

(57) ABSTRACT

A method and apparatus is disclosed herein for varying transmit power patterns in a multi-cell wireless transmission environment. In one embodiment, the method comprises varying transmit power coordination patterns for base stations in the wireless communication system to jointly vary base station power over a set of virtual channels over base stations within a cluster and across clusters of base stations; and jointly transmitting by groups of the base stations to one or more user terminals in their respective clusters based on the transmit power coordination patterns.

28 Claims, 9 Drawing Sheets

(56) References Cited

U.S. PATENT DOCUMENTS

| | | |
|---|---|---|
| 7,251,768 B2 | 7/2007 | Giannakis et al. |
| 7,308,047 B2 | 12/2007 | Sadowsky |
| 7,310,369 B1 | 12/2007 | Krieger et al. |
| 7,436,895 B1 | 10/2008 | Tujkovic |
| 7,441,045 B2 | 10/2008 | Skene et al. |
| 7,443,925 B2 | 10/2008 | Mehta et al. |
| 7,564,915 B2 | 7/2009 | Lee et al. |
| 7,620,117 B2 | 11/2009 | Chae et al. |
| 7,877,097 B2 | 1/2011 | Zhu et al. |
| 7,877,108 B2 | 1/2011 | Wengerter et al. |
| 8,027,407 B2 | 9/2011 | Papadopoulos |
| 8,042,031 B2 | 10/2011 | Chen et al. |
| 2002/0114404 A1 | 8/2002 | Aizawa et al. |
| 2002/0118781 A1 | 8/2002 | Thomas et al. |
| 2002/0176431 A1 | 11/2002 | Golla et al. |
| 2003/0002505 A1 | 1/2003 | Hoch et al. |
| 2003/0072254 A1 | 4/2003 | Ma et al. |
| 2003/0235149 A1 | 12/2003 | Chan et al. |
| 2003/0236080 A1 | 12/2003 | Kadous et al. |
| 2004/0013180 A1 | 1/2004 | Giannakis et al. |
| 2004/0022179 A1 | 2/2004 | Giannakis et al. |
| 2004/0042400 A1 | 3/2004 | Horlin et al. |
| 2004/0116146 A1 | 6/2004 | Sadowsky et al. |
| 2004/0165675 A1 | 8/2004 | Ito et al. |
| 2004/0205445 A1 | 10/2004 | Xu |
| 2005/0010675 A1 | 1/2005 | Jaggi et al. |
| 2005/0041751 A1 | 2/2005 | Nir et al. |
| 2005/0047514 A1 | 3/2005 | Bolinth et al. |
| 2005/0068918 A1 | 3/2005 | Mantravadi et al. |
| 2005/0111592 A1 | 5/2005 | Yee |
| 2005/0152391 A1 | 7/2005 | Effros et al. |
| 2005/0185707 A1 | 8/2005 | Hoo et al. |
| 2005/0220040 A1 | 10/2005 | Petrovic et al. |
| 2005/0265280 A1 | 12/2005 | Roh et al. |
| 2006/0002312 A1 | 1/2006 | Delattre et al. |
| 2006/0020560 A1 | 1/2006 | Rodriguez et al. |
| 2006/0029124 A1 | 2/2006 | Grant et al. |
| 2006/0039489 A1 | 2/2006 | Ikram et al. |
| 2006/0098760 A1 | 5/2006 | Shen et al. |
| 2006/0146716 A1 | 7/2006 | Lun et al. |
| 2006/0146791 A1 | 7/2006 | Deb et al. |
| 2006/0148506 A1 | 7/2006 | Hoo |
| 2006/0152391 A1 | 7/2006 | Sakuyama |
| 2006/0176945 A1 | 8/2006 | Li |
| 2006/0276217 A1 | 12/2006 | Khojastepour et al. |
| 2007/0041475 A1 | 2/2007 | Koshy et al. |
| 2007/0066229 A1 | 3/2007 | Zhang et al. |
| 2007/0121499 A1 | 5/2007 | Pal et al. |
| 2007/0156919 A1 | 7/2007 | Potti et al. |
| 2007/0198899 A1 | 8/2007 | Yellin et al. |
| 2007/0213013 A1 | 9/2007 | Kim |
| 2007/0223423 A1 | 9/2007 | Kim et al. |
| 2007/0281633 A1 | 12/2007 | Papadopoulos |
| 2007/0286313 A1 | 12/2007 | Nikopour-Deilami et al. |
| 2008/0025430 A1 | 1/2008 | Sadowsky |
| 2008/0032630 A1 | 2/2008 | Kim et al. |
| 2008/0075022 A1 | 3/2008 | Lei et al. |
| 2008/0092028 A1 | 4/2008 | Orio |
| 2008/0101310 A1 | 5/2008 | Marzetta |
| 2008/0123781 A1 | 5/2008 | Pisek et al. |
| 2008/0181339 A1 | 7/2008 | Chen et al. |
| 2008/0212526 A1 | 9/2008 | Oyman |
| 2009/0082054 A1* | 3/2009 | Li et al. .................. 455/522 |
| 2009/0213954 A1 | 8/2009 | Bursalioglu et al. |
| 2009/0225878 A1 | 9/2009 | Papadopoulos et al. |
| 2009/0268684 A1 | 10/2009 | Lott et al. |
| 2009/0285323 A1 | 11/2009 | Sundberg et al. |
| 2009/0291699 A1 | 11/2009 | Heath et al. |
| 2009/0296842 A1 | 12/2009 | Papadopoulos et al. |

FOREIGN PATENT DOCUMENTS

| | | |
|---|---|---|
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A1 | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2004/056011 A1 | 7/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

Lang, Yidong, et al., "A Novel Resource Allocation Strategy for Distributed MIMO Multi-Hop Multi-Commodity Communications", IEEE International ITG Workshop on Smart Antennas, Feb. 26, 2008, pp. 125-132.

PCT International Search Report for PCT Patent Application No. PCT/US2009/053471, Dec. 15, 2009, 7 pgs.

PCT Written Opinion of the International Searching Authority for PCT Patent Application No. PCT/US2009/053471, Dec. 15, 2009, 9 pgs.

US Final Office Action for U.S. Appl. No. 11/873,248, dated Sep. 1, 2010, 21 pages.

US Office Action for U.S. Appl. No. 11/939,353 dated Jan. 31, 2011, 15 pages.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

PCT International Search Report dated Sep. 18, 2008, for PCT/US08/006286, filed May 16, 2008, 4 pages.

Written Opinion of the International Searching Authority dated Sep. 18, 2008, for PCT/US08/006286, filed May 16, 2008, 8 pages.

International Search Report mailed Nov. 6, 2008 for PCT/US08/065675, filed Jun. 3, 2008, 5 pages.

Written Opinion of the International Searching Authority mailed Nov. 6, 2008 for PCT/US08/065675, filed Jun. 3, 2008, 8 pages.

International Search Report for related application WO 08/048651, dated Jun. 25, 2008.

Written Opinion of the International Searching Authority for related application WO 08/048651, dated Jun. 25, 2008.

Communication Relating to the Results of the Partial International Search dated Jan. 31, 2009 for PCT/US07/13074, filed Jun. 1, 2007.

PCT International Search Report dated Apr. 14, 2008 for PCT/US07/23207, 3 pages.

Written Opinion of the International Searching Authority dated Apr. 14, 2008 for PCT/US07/23207, 6 pages.

(56) References Cited

OTHER PUBLICATIONS

International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.
Written Opinion of the International Searching Authority dated Apr. 30, 2009 for PCT/US2007/022189, 8 pages.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2009/046014, dated Nov. 27, 2009, 8 pgs.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
US Office Action for U.S. Appl. No. 12/040,653, dated Dec. 11, 2009, 33 pages.
US Office Action for U.S. Appl. No. 11/644,638, dated Sep. 22, 2009, 13 pages.
US Office Action for U.S. Appl. No. 11/754,903, dated Mar. 29, 2010, 11 pages.
US Office Action for U.S. Appl. No. 11/873,248, dated Mar. 31, 2010, 18 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.

Alamouti, Siavash M., "A Simple Transmit Diversity Technique for Wireless Communications", IEEE Journal on Select Areas in Communications, vol. 16, No. 8, Oct. 1998, pp. 1451-1458.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Lee, Inkyu, et al., "Space-Time Bit-Interleaved Coded Modulation for OFDM Systems", IEEE Transactions on Signal Processing, vol. 52, No. 3, Mar. 2004, pp. 820-825.
Lee, Heunchul, et al., "A Flexible Space-Time Coding System with Unequal Error Protection", IEEE, 2005, 5 pages.
Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.
Lee, Inkyu, et al., "Code Construction for Space-Time Bit-Interleaved Coded Modulation Systems", IEEE Communications Society, 2004, 5 pages.
Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.
Lee, Inkyu, et al., "Code Design of Space-Time Bit-Interleaved Coded Modulation Systems for Maximum Diversity", ICC, Jun. 2004, 11 pages.
Taddei, Herve, et al., Mode Adaptive Unequal Error Protection for Transform Predictive Speech and Audio Coders, IEEE, 2002, pp. 165-168.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.
Wong, K., "The Soft-Output M-Algorithm and Its Applications", PhD Thesis, Queens University, Kingston, Canada, Aug. 2006, 263 pages.
Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.
Seshadri, N., et al., "List Viterbi Decoding Algorithms with Applications", IEEE Transactions on Communications, vol. 42, No. 2/3/4, Feb./Mar./Apr. 1994, pp. 313-323.
Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.
Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Wong, K.K.Y., et al., "Bi-directional soft-output m-algorithm for iterative decoding", IEEE International Conference on Communications, vol. 2, Jun. 2004, pp. 792-797.
Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Papadopoulos, H., et al., "Wideband space-time coded systems with non-collocated antennas", Radio and Wireless Symposium, 2008 IEEE, Jan. 22, 2008, pp. 307-310.
Lee, Inkyu, et al., "Diversity Analysis for Space-Time, Bit-Interleaved Coded Modulation Systems", Korea University, Seoul, Korea, Jan. 2007.

(56) References Cited

OTHER PUBLICATIONS

Gencata, et al., "Virtual-topology adaptation for WDM mesh networks under dynamic traffic," Proceedings of IEEE Infocom 2002, vol. 1, Jun. 23, 2002, pp. 48-56.
Koetter, R., et al., "Beyond routing: an algebraic approach to network coding," Proceedings of IEEE Infocom 2002, vol. 1, Jun. 23, 2002, pp. 122-130.
Del Re, Enrico, et al., "Next-Generation Mobile Satellite Networks," IEEE Communications Magazine, vol. 40, No. 9, Sep. 1, 2002, pp. 150-159.
Ernest, P.H.H., et al., "An efficient algorithm for virtual topology reconfiguration in WDM optical ring networks," Proceedings of 10th Conference on Computer Communications and Networks, Oct. 15, 2001, pp. 55-60.
Fasolo, E., "Network coding techniques," www.cs.virginia.edu/{yw5s/Network%20coding.ppt, Mar. 7, 2004, pp. 1-14.
Chou, P.A., et al., "Network Coding for the Internet and Wireless Networks", www.eecs.umich.edu/systems/ChouSeminar.ppt, Mar. 28, 2006, pp. 1-29.
Ahlswede, R., et al., "Network Information Flow", IEEE Transactions on Information Theory, IT-46(4), Jul. 2000, pp. 1204-1216.
Ho, T., et al., "The Benefits of Coding Over Routing in a Randomized Setting", in the Proceedings of the International Symposium on Information Theory (ISIT), Jun. 2003, pp. 1-6.
Katti, S., et al., "XORs in the Air: Practical Wireless Network Coding", in the Proceedings of the ACM Special Interest Group on Data Communication (SIGCOMM), Sep. 2006, 12 pages.
Koetter, R., et al., "An Algebraic Approach to Network Coding", IEEE/ACM Transactions on Networking, vol. 11, No. 5, Oct. 2003, pp. 782-795.
Li, S. R., et al., "Linear Network Coding", IEEE Transactions on Information Theory, IT-49(2), Feb. 2003, pp. 371-381.
Chou, P.A., et al., "Practical Network Coding", 51st Allerton Conference on Communication, Control and Computing, Oct. 2003, 10 pages.
Cormen, T.H., et al., "Introduction to Algorithms", 2nd Edition, MIT Press and McGraw-Hill, 2001, pp. 643-700.
Jafarkani, H., "Space-Time Coding, Theory and Practice", Cambridge University Press, 2005.
Yiu, S., et al., "Distributed Space-Time Block Coding", IEEE GLOBECOM 2005 Proceedings, Nov. 2005.
Su, W., et al., "Signal Constellations for Quasi-Orthogonal Space-Time Block Codes with Full Diversity", IEEE Transactions on Information Theory, Oct. 2004, pp. 2231-2347.
Jafarkani, H., "A Quasi-Orthogonal Space-Time Block Code", IEEE Transactions on Communications, Jan. 2001, 4 pages.
Tirkkonen, O. et al.: "Minimal Non-Orthogonality Rate 1 Space-Time Block Code for 3+ Transmit Antennas," IEEE 6th Int. Symp. Spread Spectrum Tech. And Appl., pp. 429-432, Sep. 2000, 4 pages.
Sharma, N. et al.: "Improved Quasi-Orthogonal Codes Through Constellation Rotation," IEEE Trans. Communications, pp. 332-335, Mar. 2003, 3 pages.
Wang, H. et al.: "Upper Bounds of Rates of Space-Time Block Codes from Complex Orthogonal Designs," IEEE Trans. Information Theory, pp. 2788-2796, Oct. 2003, 9 pages.
El Gamal, H. et al., "Distributed Space-Time Filtering for Cooperative Wireless Networks", GLOBECOM'03, Dec. 2003, pp. 1826-1830.
Sezgin, A., et al., "On EXIT-Chart Analysis of Coherent and Non-Coherent Space-Time Codes", Smart Antennas, 2004, pp. 49-56.
Horn, R.A., et al., "Matrix Analysis", Cambridge University Press, New York, 1994.
Tse, D., et al., "Fundamentals of Wireless Communication", Cambridge University Press, May 2005.
Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.
Guerin, R., et al., "Quality-of-Service in Packet Networks: Basic Mechanisms and Directions", Invited Paper, Computer Networks, vol. 31, No. 3, Feb. 1999, pp. 1-16.
Zhang, H., "Service Disciplines for Guaranteed Performance Service in Packet-Switching Networks", in the Proceedings of the IEEE, vol. 83, No. 10, Oct. 1995, pp. 1-23.
Caire, G., et al., "Achievable Throughput of MIMO Downlink Beamforming and Limited Channel Information", Proceedings of IEEE PIMRC, Aug. 2007.
Medard, M., "The Effect upon Channel Capacity in Wireless Communication of Imperfect Knowledge of the Channel", IEEE Transactions on Information Theory, May 2000, pp. 935-945.
Marzetta, T.L., "How Much Training Is Required for Multi-User MIMO?", ACSSC96, Asilomar Conference Oct. 2006.
Viswanath, P., et al., "Sum Capacity of the Multiple Antenna Gaussian Broadcast Channel and Uplink-Downlink Duality", IEEE Transactions on Information Theory, Aug. 2003, pp. 1912-1923.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Joham, M., et al., "Linear Transmit Processing in MIMO Communications Systems", IEEE Transactions on Signal Processing, Aug. 2005, pp. 2700-2712.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Michalke, Clemens, et al., "Linear Momo Receivers vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
Robertson, Patrick, et al., "A Comparison of Optimal and Sub-Optimal Map Decoding Algorithms Operating in the Log Domain", Proceedings of the International Conference on Communications, Jun. 18, 1995, pp. 1009-1013, vol. 2, IEEE, New York, USA.

(56) References Cited

OTHER PUBLICATIONS

Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 12/209,110 dated Feb. 11, 2011 , 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 12/040,653, dated Jun. 15, 2010 , 40 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages.
Caire, G., et al., "Multiuser MIMO Achievable Rates with Downlink Training and Channel State Feedback", 31 pages.
Marzetta, T., "How Much Training Is Required for Multiuser MIMO?", 5 pages.
Taoka, H., et al., "Field Experiments in Ultimate Frequency Efficiency Exceeding 30 bit/Second/Hz Using MLD Signal Detection in MIMO-OFDM Broadband Packet Radio Access", 6 pages.
US Final Office Action for U.S. Appl. No. 12/209,110, dated Jul. 14, 2011 , 26 pgs.
US Office Action for U.S. Appl. No. 12/335,409, dated Aug. 16, 2011 , 20 pgs.
US Notice of Allowance for U.S. Appl. No. 11/664,638, dated Jun. 9, 2011 , 10 pgs.
US Office Action for U.S. Appl. No. 11/754,903, dated Jun. 6, 2011, 11 pgs.
US Office Action for U.S. Appl. No. 11/644,638, dated Sep. 30, 2010 , 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
US Office Action for U.S. Appl. No. 12/538,733, Oct. 18, 2011 , 11 pgs.
US Final Office Action for U.S. Appl. No. 12/538,733, Mar. 17, 2012 , 6 pgs.
US Final Office Action for U.S. Appl. No. 12/335,409, Mar. 19, 2012, 22 pgs.
US Office Action for U.S. Appl. No. 12/335,389, Apr. 12, 2012 , 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012 , 8 pgs.
PCT International Search Report for PCT Patent Application No. PCT/US2009/046014, dated Nov. 27, 2009, 7 pgs.
Written Opinion of the International Searching Authority for PCT Patent Application No. PCT/US2007/013074, dated Dec. 2, 2009, 8 pgs.
PCT International Preliminary Report on Patentability for PCT Appl. No. PCT/US2009/046014, Dec. 6, 2010, 7 pgs.
PCT International Search Report for PCT Patent Application No. PCT/US2009/046014, Nov. 27, 2009, 3 pgs.
PCT International Preliminary Report on Patentability for PCT Appl. No. PCT/US2009/034758, Aug. 31, 2010, 6 pgs.
PCT Writen Opinion of the International Searching Authority for PCT Patent Application No. PCT/US2009/046014, Nov. 27, 2009, 6 pgs.
PCT International Preliminary Report on Patentability for PCT Appl. No. PCT/US2009/053472, Feb. 15, 2011, 5 pgs.
European Office Action for European Patent Application No. 09715574.1, Jan. 11, 2012, 6 pgs.
European Office Action for European Patent Application No. 08832132.8, Feb. 10, 2012, 5 pgs.
US Office Action for U.S. Appl. No. 12/700,585, dated Oct. 15, 2012, 9 pgs.
US Final Office Action for US Patent Application No. 12/209,110, dated Dec. 28, 2012, 40 pgs.
US Office Action for U.S. Appl. No. 12/546,471, dated Dec. 26, 2012, 11 pgs.
US Office Action for U.S. Appl. No. 12/558,367, dated Feb. 15, 2013, 13 pgs.
US Office Action for U.S. Appl. No. 12/772,717, dated Feb. 13, 2013, 11 pgs.
Sen, et al., "Cute and jCUTE Concolic Unit Testing and Explicit Path Model-Checking Tool", Computer Aided Verification Lecture Notes in Computer Science, Jan. 1, 2006, pp. 419-423.

(56) References Cited

OTHER PUBLICATIONS

Majumdar, et al., "Hybrid Concolic Testing", IEEE 29th International Conference on Software Engineering, May 1, 2007, pp. 416-426.

Taddei, Nerve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.

Marsch, Patrick, et al., On multicell cooperative transmission in backhaul-constrained cellular systems, Annals of Telecommunications, May 1, 2008, pp. 253-269, vol. 63, No. 5/6.

Lang, Yidong, et al., "A Novel Resource Allocation Strategy for Distributed MIMO Multi•Hop Multi-Commodity Communications", JEEE International ITG Workshop on Smart Antennas, Feb. 26, 2008, pp. 125-132.

Karakayali, M., et al., "On the Maximum Common Rate Achievable in a Coordinated Network", Mar. 3, 2006, 6 pages.

Caire, G., et al., "On the Achievable Throughput of a Multiantenna Gaussian Broadcast Channel", IEEE Transactions on Information Theory, vol. 49, No. 7, Jul. 2003, pp. 1691-1706.

Ernesto Zimmermann, "Complexity Aspects in Near-Capacity MIMO Detection-Decoding", Jan. 1, 2007, pp. 39-70.

Ernesto Zimmermann, et al., "Unbiased MMSE Tree Search Detection for Multiple Antenna Systems", Proceedings of the International Symposium on Wireless Personal Multimedia Communications, Sep. 1, 2006, pp. 806-810.

US Notice of Allowance for U.S. Appl. No. 12/538,733, dated Apr. 26, 2012, 6 pgs.

US Office Action for U.S. Appl. No. 12/476,066, dated May 30, 2012, 14 pgs.

US Notice of Allowance for U.S. Appl. No. 12/335,409, dated Jul. 19, 2012, 8 pgs.

US Office Action for U.S. Appl. No. 12/546,471, dated May 21, 2012, 11 pgs.

US Office Action for U.S. Appl. No. 12/209,110, dated Jun. 12, 2012, 39 pgs.

US Notice of Allowance for U.S. Appl. No. 11/644,638, dated Jun. 9, 2011, 11 pgs.

US Notice of Allowance for U.S. Appl. No. 12/121,634, dated Aug. 12, 2011, 9 pgs.

Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.

Jing, et al., "Distributed Space-Time Codes in Wireless Relay Networks", 2004 IEEE Sensor Array and Multichannel Signal Processing Workshop, Jul. 21, 2004, pp. 249-253.

Japanese Office Action for related Japanese Patent Application No. 2009-513327, Aug. 7, 2012, 3 pgs. *English Translation*.

* cited by examiner

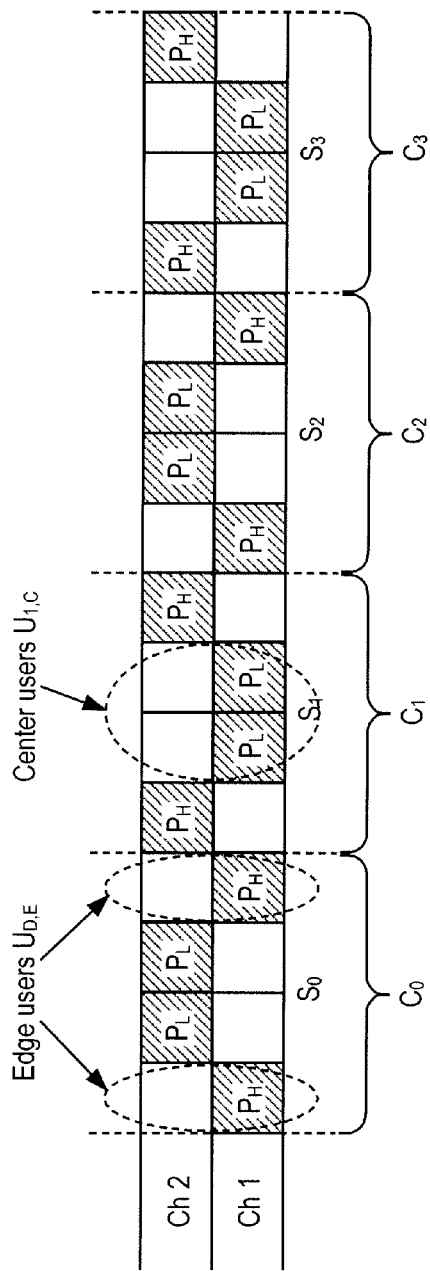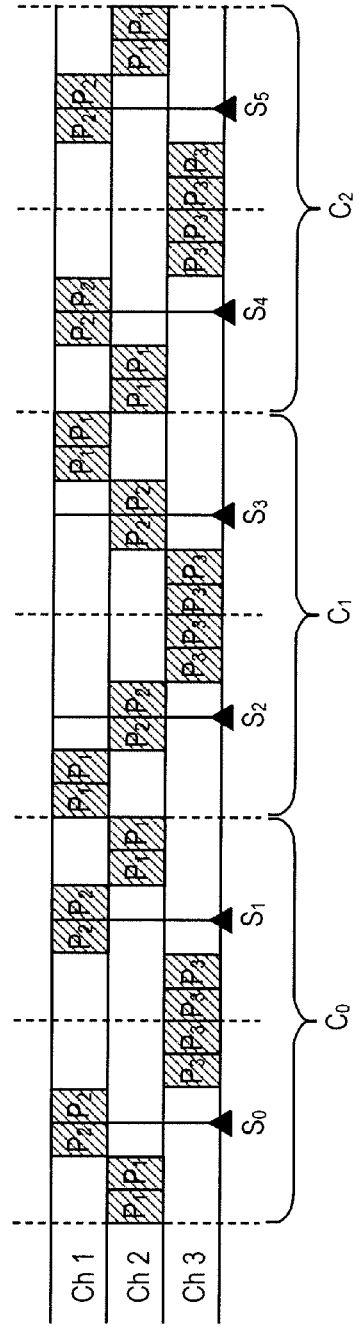
FIG. 4
FIG. 5

METHOD FOR VARYING TRANSMIT POWER PATTERNS IN A MULTI-CELL ENVIRONMENT

PRIORITY

The present patent application claims priority to and incorporates by reference the corresponding provisional patent application Ser. No. 61/089,096, titled, "A Method for Joint User Scheduling and MIMO Transmission by Using Varying Transmit Power Patterns and Varying Antenna-User Coordination Patterns in a Multi-Cell Environment," filed on Aug. 13, 2008.

RELATED APPLICATIONS

The present application is related to the following applications: U.S. patent application Ser. No. 12/538,729, filed Aug. 10, 2009, titled "A Variable Coordination Pattern Approach for Improving Performance in Multi-Cell or Multi-Antenna Environments", and U.S. patent application Ser. No. 12/538,733, filed Aug. 10, 2009, titled "A Method of Combined User and Coordination Pattern Scheduling Over Varying Antenna and Base Station Coordination Patterns in a Multi-Cell Environment", concurrently filed herewith.

FIELD OF THE INVENTION

Embodiments of the present invention are related to the field of coordinated transmission in wireless communication systems; more particularly, embodiments of the present invention are related to varying the transmit power of base stations in clusters in a coordinated manner across a multi base station environment, so that different base stations within a cluster operate together to transmit over multiple frequencies, bands and/or channels at different power levels, and so that the variations are jointly coordinated across all the clusters.

BACKGROUND OF THE INVENTION

Emerging and future wireless systems require ever increasing efficiency in the utilization of the radio frequency spectrum in order to increase the data rate achievable within a given transmission bandwidth. Increases in the throughput achievable per unit bandwidth can be accomplished by employing multiple transmit and receive antennas combined with signal processing. Indeed, a number of recently developed techniques and emerging standards are based on employing multiple antennas at a base station to improve the reliability of data communication over wireless media without compromising the effective data rate of the wireless systems. Alternatively, the multiple antennas can be used to increase the data rates achievable per unit bandwidth.

Specifically, recent advances in wireless communications have demonstrated that by jointly encoding symbols over time and space (e.g., using multiple transmit antennas at a base station) one can obtain reliability (diversity) benefits as well as increases in the effective data rate from the base station to each cellular user. These multiplexing (throughput) gains and diversity benefits are inherently dependent on the number of transmit and receive antennas in the system being deployed, in the sense that they are fundamentally limited by the multiplexing-diversity trade-offs curves that are dictated by the number of transmit and the number of receive antennas in the system. Very high-rate designs have been demonstrated that achieve very high spectral efficiencies by exploiting large numbers of transmit and receive antennas. Such MIMO schemes form the basis of what are referred to as single-user MIMO systems. According to these schemes, channels corresponding to a distinct set of time-frequency slots are used to send multiple streams to a single user by coding an information bearing stream into a signal that is transmitted over the multiple antennas on the allocated channel. A scheduler is then used to schedule the transmissions for different users on different channels, in a similar way that it is done in a SISO transmission.

Recently, it was demonstrated that very high sum-rates (i.e., the sum of the rates of the users who are being transmitted to) can be obtained with simple mobiles employing one or two antennas, provided that several transmit antennas are available at the base-station, and all the transmit-receive channels are known to the transmitting base station. These techniques are referred to as Multi-User MIMO (MU-MIMO) schemes. The achievable rates by these schemes in general strongly depend on the quality of the channel estimates available at the base station. One of the simplest classes of multiuser MIMO precoders, known as zero-forcing (or block zero-forcing) MU-MIMO precoders, use knowledge of all the channels between transmit/receive antenna pairs in order to linearly precode the users' signals that are to be transmitted, so that the receiver of each user "sees" its own signal in noise.

Existing multicell deployments are known to provide uneven throughputs to different users, with users at the edge of each cell suffering in throughput with respect to users in the center of the cell. A number of schemes have been proposed for multicell deployments using MIMO transmission. Some multicell deployments employ isolated-cell joint scheduling/MIMO preceding algorithms without coordination across cells. Coordination is limited to the antennas within each cell. Also while these schemes are readily scalable, they are limited by interference (coming from antennas located outside the cell) and suffer greatly in edge throughput. Some fully coordinated multicell deployments are not interference-limited and can provide arbitrarily high sum-throughput (with increased power) and arbitrarily high edge throughput. However, they are not scalable as all transmit antennas across all cells need to be coordinated. Also the complexity grows very fast with the number of antennas in the whole network and the number of users that need to be scheduled, and quickly becomes impractical. Therefore, the scheme provides an upper bound on the performance of any practical scheme.

The current evolution of the 3G standard, termed Long-Term Evolution (LTE), proposes an inter-cell interference coordination technique whereby the power levels of different channels are adjusted differently in adjacent cells. As a result, the interference seen by edge users is reduced and higher data rates can be achieved. LTE assumes a Single-User MIMO (SU-MIMO) transmission in the downlink and within each cell. In addition, base stations (or controllers) always control the same set of antennas, the power levels across channels remain unchanged over time and the same set of users for scheduling.

SUMMARY OF THE INVENTION

A method and apparatus is disclosed herein for varying transmit power patterns in a multi-cell wireless transmission environment. In one embodiment, the method comprises varying transmit power coordination patterns for base stations in the wireless communication system to jointly vary base station power over a set of virtual channels over base stations within a cluster and across clusters of base stations;

and jointly transmitting by groups of the base stations to one or more user terminals in their respective clusters based on the transmit power coordination patterns.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 illustrates a two-channel power/user scheduling allocation pattern for 4 controllers.

FIG. 5 illustrates a three channel power/user scheduling allocation pattern.

DETAILED DESCRIPTION OF THE PRESENT INVENTION

Figure 1:
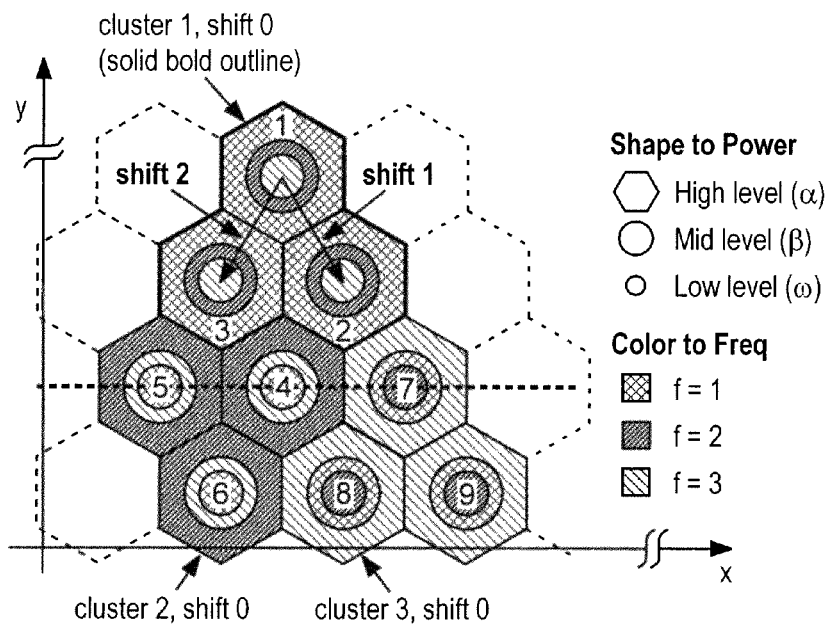
FIG. 1 illustrates an example layout of clusters of size 3 with three subchannels per cluster.

Embodiments of the present invention include multi-cell deployments that systematically coordinate resources and users among a set of controllers. In one embodiment, each controller is part of a cluster, or a base station. In one embodiment, the coordination of resources occurs in a time-varying manner (e.g., a periodically time varying manner). In particular, these schemes coordinate the use of the following: (i) the set of transmit antennas controlled by each controller; (ii) the transmit power limitations imposed on the antennas controlled by each controller; (iii) the set of users considered for scheduling per controller. Embodiments of the present invention jointly vary the power-level patterns applied to each channel over time/frequency slots and for each controller. More specifically, the base station transmit power levels are allocated over the channels over the base stations in a cluster and over other clusters of base stations. That is, the power of the base stations within a cluster are a priori chosen but jointly with associated powers of base stations in other clusters, and are all jointly varied over a set of channels $1, 2, \ldots, F$, such that the transmit power level allocations are not independent from the associated allocations in other (including neighboring) clusters. This results in increased throughputs for all users and a fairer performance between cell users and edge users without much increase in complexity compared to a non-coordinated system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Techniques for varying transmit power patterns in a wireless communication system are described. In one embodiment, the method comprises varying transmit power coordination patterns for base stations in the wireless communication system to jointly vary base station transmit power over a set of virtual channels over base stations within a cluster and across clusters of base stations and jointly transmitting by groups of the base stations to one or more user terminals in their respective clusters based on the jointly varied transmit power coordination patterns. In this manner, the transmit power of the base stations within a cluster are chosen but jointly with associated transmit powers of base stations in other clusters, and are all jointly varied over a set of virtual channels. The virtual channels may be frequency subbands, time-frequency slots, or other transmission resources, such as for example, spreading codes.

In one embodiment, varying the transmit power coordination patterns among the first plurality of clusters comprises assigning a transmit power pattern to each cluster of base stations in a manner that ensures that the transmit power of at least two base stations in a cluster is different for at least one of the virtual channels. In another embedment, transmit power coordination patterns are assigned so that base stations at edges of adjacent clusters transmit over at least one virtual channel at different power levels. In yet another embodiment, transmit power coordination patterns are assigned to cause centrally located base stations (or, any base-station for which all of its neighboring base-stations belong to the same cluster as the base station) for all or a group of clusters to transmit at the same power level. Thus, the transmit power allocation patterns are varied over different channels.

As an example, suppose that a system has twelve base stations identified with base station IDs 1-12, divided into four clusters, and using two frequencies $f_1$ and $f_2$. Assume also a one-dimensional base station layout representation whereby a station with ID k has base station with ID k−1 as its left neighbor and base-station k+1 as its right neighbor, for k=2, . . . , 11. Assume also a wrap-around model, whereby base-station 12 is the left neighbor of base-station 1. In one embodiment, the base station clusters and each of the allocated power levels for the base stations in four adjacent clusters for the two frequencies may be as follows:

|  | [1, 2, 3] | [4, 5, 6] | [7, 8, 9] | [10, 11, 12] |
| --- | --- | --- | --- | --- |
| $f_1$ | H H" H | L H' L | H H" H | L H' L |
| $f_2$ | L H' L | H H" H | L H' L | H H" H |

Thus, as shown in the example above, the power levels for transmitting within each different frequency band for each cluster are allocated in a non-uniform manner in which none of the transmit powers are the same for each base station for the same frequency.

One advantage of these techniques is that by judiciously jointly varying the transmit power-allocation patterns over different channels (and the choice of these power patterns is optimized via offline optimization), together with the user sets for scheduling and, potentially, the antenna sites controlled by each controller, scalable multiuser MIMO deployments with many of the performance benefits of the (impractical) fully coordinated multiuser MIMO systems can be obtained. Good sets with such power/user set/antenna-site-set assignment patterns can be a priori generated offline or (regenerated periodically) and stored in lookup tables at the base station controllers. In one embodiment, these user-sets are (although not necessarily) disjoint across controllers over any given channel, but can be jointly varied from one channel to another. In addition, from channel to channel, the transmit power levels allocated to different controllers are also systematically and jointly varied. Furthermore, the antennas controlled by a single controller (and the transmit power allocated to these antennas, individually, or in groups) can also vary over time and/or over frequency bands.

Cluster and Power Allocation

As set forth herein, base stations (or transmit antennas) are grouped in clusters and power levels are assigned to each cluster for each frequency, channel or subband, such that the base stations within a cluster operate in a coordinated fashion in which the transmit power is jointly varied for different clusters.

FIG. 1 shows a layout with coordination clusters of size C=3. Base stations are enumerated conveniently for the purpose of illustration. For simplicity, only the clusters "cluster 1"={1,2,3}, "cluster 2"={4,5,6}, "cluster 3"={7,8,9} are shown explicitly. Note that the system may have more or less than three clusters (typically a lot more).

In one embodiment, all base stations in a cluster are fully coordinated. That is, their antennas act effectively as a single MIMO transmitter with $CN_T$ antennas, subject to a per-base station sum-power constraint. This can be implemented in practice by connecting the base station in each cluster to a cluster controller (processor) that collects all channel state information measurements from all user terminals in the cluster and, at each new time frame, schedules the set of users to be simultaneously served in the downlink and the corresponding beamforming vectors, power allocation and user codewords. Note that the cluster joint processing involves only a limited number of base stations per each cluster controller (processor). In this way, the system complexity is bounded even when in the limit when a large number of base stations are used to provide coverage over a very large area ($N_{bs} \to \infty$).

Figure 2:
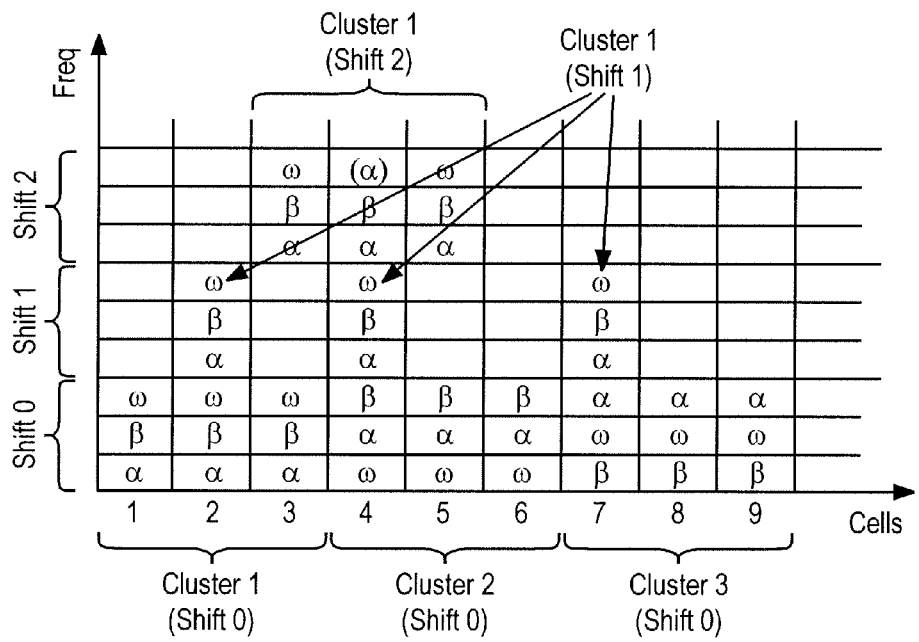
FIG. 2 illustrates a frequency power allocation in the arrangement of FIG. 1.

The chart of FIG. 2 shows the allocation of clusters and base-station power allocation coefficients (referred to as "power mask" for purposes herein) to frequency subchannels. In this example, the total downlink system bandwidth is divided into 3 subbands, corresponding to 3 different clustering layouts. As shown in FIG. 1, base stations 1, 2 and 3 transmit signals of frequency f=1 at high power level (α), signals at frequency f=2 at mid-level power (β), and signals at frequency f=3 at low power level (ω). Also, base stations 4, 5 and 6 transmit signals of frequency f=1 at mid-power level (β), signals at frequency f=2 at high level power (α), and signals at frequency f=3 at low power level (ω), while base stations 7, 8 and 9 transmit signals of frequency f=3 at high power level (α), signals at frequency f=1 at mid-level power (β), and signals at frequency f=2 at low power level (ω).

In one embodiment, an overlapped, or intertwined, coordination architecture is obtained by shifting the basic layout of FIG. 1. Each shift is assigned to a subband. In the example, the shift vectors are chosen such that cell 1 in the reference "cluster 1"={1,2,3} can be translated (by one of three shifts) onto cells 1, 2 and 3 of the same cluster. In one embodiment, the three overlapped clusters arrangements are obtained shifting arrangements of FIG. 1 by the three lattice vectors "shift 0"=0, "shift 1"=$x_{bs}(2)-x_{bs}(1)$ and "shift 2"=$x_{bs}(3)-x_{bs}(1)$ in $\Lambda_{bs}^3$. For example, cluster 1 for the "shift 1" arrangement is {2,4,7}, while cluster 1 for the "shift 2" arrangement is {3,4,5}. In one embodiment, all other clusters are defined similarly, by rigid translation (modulo the torus topology) of the boundaries of the clusters of the reference arrangement ("shift 0").

As shown in FIG. 2, each cluster arrangement is associated with a subband. Therefore, all signals transmitted on the subband denoted by "shift s", with s=0,1,2, are jointly coordinated by the base station clustered according to the cluster arrangement corresponding to shift s. In order to implement such a scheme, any set of adjacent 3 base stations needs to be connected to a cluster processor. However, each controller (processor) treats jointly only 3 base stations at a time. Therefore, in one embodiment, the high-speed interconnections necessary for joint transmission scheme involve only local links.

In FIG. 2, each cluster subband is further divided into subchannels (3, in this example). We let F denote the total number of subchannels and let P denote the non-negative array of dimension $F \times N_{bs}$ containing all power power mask coefficients. For example, FIG. 2 shows (qualitatively) P for the running example of clusters of size 3, with F=9. Assuming that each base station can transmit at a power level that is at most a nominal value of 1, the per-base station sum power constraint imposes that $$\frac{1}{F}\sum_{f=1}^{F} p_{b,f} \leq 1,$$

where $p_{b,f}$ denotes the power-mask coefficient for base station b and frequency subchannel f. Given the symmetry of the clusters, in one embodiment, the power masks are symmetric. In this example, the coefficients α, β, and ω are repeated in each column of P. In general, when all elements of P are strictly positive, each cluster makes use of the whole system bandwidth (full frequency reuse). In one embodiment, the coefficients are chosen such that α≥β≥ω≥0.

The above example involving clusters of size C=3 and power allocations can be generalized to clusters of arbitrary size C forming a regular tiling of the hexagonal lattice, and an arbitrary number of shifts. For purposes here, systems using only one cluster arrangement are referred to as "no shift". Systems using C clusters corresponding to all C possible shift vectors that translate a cell to the C cells of the basic cluster are referred to herein as "full shift", and systems with a C' shifts, with 1<C'<C, are referred to as "partial shifts". The scheme depicted in the example of FIGS. 1 and 2 is a full-shift for C=3.

Figure 3:
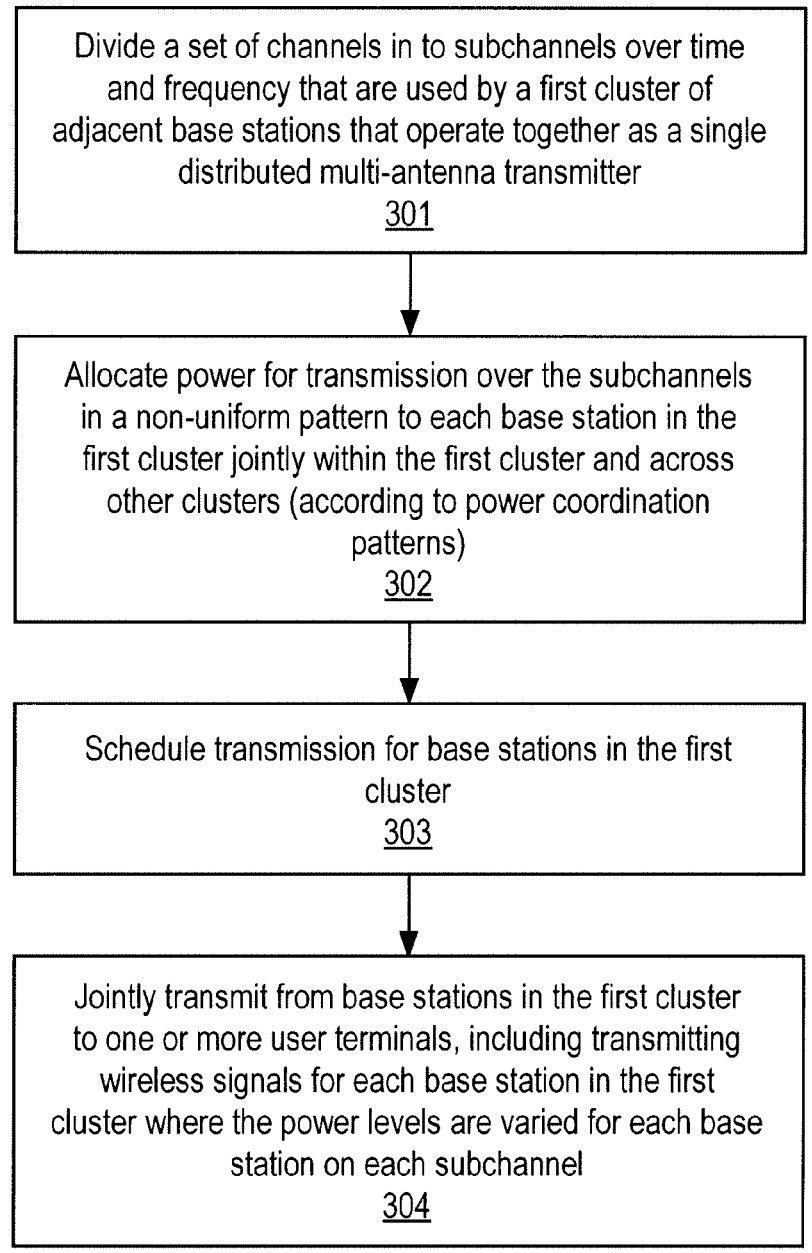
FIG. 3 is a flow diagram of one embodiment of a process for controlling a base station.

FIG. 3 is a flow diagram of one embodiment of a process for varying transmit power in a communication system. The process is performed by processing logic that may comprise hardware (e.g., dedicated logic, circuitry, etc.), software (such as is run on a general purpose computer system or a dedicated machine), or a combination of both.

Referring to FIG. 3, the process begins by processing logic dividing a set of channels used by a first cluster of adjacent base stations that operate together as a single distributed multi-antenna transmitter into subchannels (processing block 301). In one embodiment, the channels are divided into frequency subbands.

After dividing the subband, processing logic allocates power for transmission over the subchannels in a non-uniform pattern to each base station in the first cluster jointly within the first cluster and across other clusters (processing block 302). In one embodiment, allocating power for transmission comprises setting each base station in the first cluster to transmit in at least two of the subchannels as different power levels over each subchannel in a non-uniform manner among the base stations of the first cluster.

Subsequently, processing logic schedules transmissions for base stations in the first cluster (processing block 303) and causes the joint transmission from base stations in the first cluster to one or more user terminals, including transmitting wireless signals on each of the subchannels whereby the transmit power at each base station and each cluster complies with the pre-assigned power levels of the power coordination patterns (processing block 304). In one embodiment, the process further comprises shifting a number of base stations into different clusters that each operate together as a single distributed multi-antenna transmitter, and reassigning transmit power coordination patterns to each of the different clusters in a manner that ensures that at least two base stations in a cluster have transmit power levels for at least one of the subchannels that are different.

The transmit-power-level patterns generate transmit-power variations in a systematic manner over each channel. In particular, over any given channel and within a given cluster, the associated transmit power levels within the cluster and across all clusters within some level of proximity implicitly result in favoring certain users to be chosen by the scheduling/MIMO transmission algorithm within the cluster. The power allocation pattern across the cluster deployment accomplishes this by affecting the signal-to-interference-plus-noise ratio (SINR) of each user. The transmit power at the controller serving a user in a given channel affects the large-scale signal level received by any given user, while the associated transmit powers at the controllers controlling neighboring antennas generate interference signals to this user and dictate the large-scale aggregate interference level experienced by that user. By properly selecting (e.g., via offline optimization) a set of power-level patterns that are to be applied in unison across the multi-cell deployment, and by, e.g., periodically cycling through them over frequency/time slots, high sum-rate deployments can be obtained with lower spreads in throughputs between center users and edge users.

In one embodiment, the techniques attempt to strike a balance between complexity of implementation, scalability, and performance. If the patterns are properly designed, different (and possibly distinct) subsets of users are favored for scheduling over different channels and by different controllers. As a result, the complexity of the scheduler/MIMO algorithm run by each controller can be further reduced (without significantly compromising its performance), by means of restricting the size of the scheduling sets that each controller operates on within any given channel. In addition, as the powermasks "bias" the SINR levels that each user is experiencing within different channels, each user is favored for scheduling (and may only be considered for scheduling) only on a small subset of the channels. As channel state information may be required to consider a user for scheduling within a channel, such power-mask variations can also potentially allow reducing the channel training overhead of the system without appreciable system performance degradation.

Embodiments of the invention include methods for joint scheduling and physical-layer transmission in the forward link of multicell environments. In one embodiment, there are multiple controllers, each controlling the transmission from a set of transmit antennas, which may be at one site or at multiple sites. In one embodiment, wideband multiuser transmission is achieved using coded Multiple-Input Multiple-Output (MIMO)/Orthogonal Frequency Division Multiplexing (OFDM). Joint scheduling/MIMO transmission is performed over groups of time-frequency slots in the OFDM transmission viewed as channels. The MIMO transmission technology can be either single-user MIMO or multiuser MIMO.

According to one embodiment, the time-frequency slots (whereby a slot corresponds to a single OFDM tone over a given OFDM block) are mapped (possibly as groups) on to channels. Over each channel, each controller is assigned a set of transmit antenna sites, a given transmit power limit, and a subset of user terminals to consider in its scheduling/MIMO transmission algorithm. In one embodiment, each controller controls one or more base stations that are in a cluster. The controller may be in a base station, a separate unit, or distributed throughout multiple base stations.

Building blocks for embodiments of the present invention described herein are as follows: (a) a set of transmit antenna sites with one or more antennas per site; (b) a set of controllers (e.g., base stations in a cluster or in multiple clusters); (c) a set of virtual channels, and a mapping of physical (time/frequency) channels to these virtual channels in a time-varying manner; (d) a set of mappings of antennas to controllers, whereby a single mapping is associated with each virtual channel; (e) a set of transmit power-level patterns allocated over the set of controllers, whereby a single pattern across controllers is associated with each virtual channel; (f) a set of partitions of users to controllers for scheduling, whereby a single set of users-controllers partition is associated with each virtual channel; (g) a joint scheduling/MIMO transmission algorithm. In one embodiment, the MIMO transmission algorithm is a multiuser MIMO precoding algorithm (e.g., block zero-forcing precoder). In another embodiment, the MIMO transmission algorithm is a single-user MIMO algorithm. The user selection algorithm could be based on proportional fairness or any other criterion. Within any given channel, a joint scheduling/MIMO transmission algorithm is run over each controller separately (over the set of users specified by the partition map) with respect to a given scheduling criterion.

Two-Stage Operation

In one embodiment, varying base-station cooperation patterns and transmit power masks are implemented as a two-stage operation. The following two-stage operation is described in terms of controllers. These controllers may be part of a base station controlling one or more antennas.

In stage 1, a set of parameters that are to be used in stage 2 by each controller are generated. These parameters are stored in a lookup table indexed by a number of (virtual) channels, 1, 2, ..., F. For a given channel entry with index f, the lookup table provides parameters for the joint scheduling/MIMO transmission that are to be used by each controller. In one embodiment, once the lookup table is generated, it is pushed to the controllers. In one embodiment, although the entire lookup table could be pushed to each controller, only the subset of parameters pertaining to the operation of that controller is pushed to each controller. Note also, that stage 1 can be a one-shot computation, e.g. an offline optimization, or, more generally, an optimization that is performed at timescales that are typically considerably longer than the scheduling/transmission operations in stage 2.

Stage 2 corresponds to the joint scheduling/transmission operations that are run by each controller. In one embodiment, the set of controllers perform this operation in parallel. Within each physical channel, each controller first identifies the actual "virtual channel" that this corresponds to in the lookup table, and fetches the corresponding parameters from the lookup table. In one embodiment, these parameters include: (i) the set of transmit antennas and sites from which the controller is transmitting within this channel; (ii) the transmit power constraints on the controller for this channel; (iii) the set of users that need to be considered for scheduling by the controller's joint scheduling/MIMO transmission algorithm.

In one embodiment, there are one or more repositories of real-time scheduling parameters for each user (containing, e.g. updated versions of the user weights, in the scheduling algorithm). When required, each controller accesses the repositories in order to guarantee that it has available the relevant weights/parameters for all the users it will be considering for scheduling within the given channel. Consequently, the joint scheduling/transmission algorithm is implemented, a subset of users is chosen and served, and information is pushed in the repositories to update the weights of all the users in the serving set. In one embodiment, this update occurs locally at each controller, in which case, updated weights/parameters for the controller user-scheduling set are pushed to the associated repositories. In another embodiment, sets of parameters summarizing the users served and their rates can be pushed back to the repositories, where the updated weights/parameters are computed and stored.

The following representative high-level code shows a logical set of operations that are performed on a sample controller within stage 2:

1) Obtain controller's section of the scheduling/transmission parameter lookup table (generated in Stage 1).
2) For each physical channel k, in k=1, 2, ..., K
   a. Associate physical channel k to a virtual channel (either via the lookup table, or in a deterministic way). Let f=f(k) denote the associated index of this virtual channel.
   b. Fetch from lookup table (obtained in logical step 1) the entry associated with channel index f.
   c. Request real-time scheduling parameters from repositories for all the users in the scheduling set listed in the lookup table entry. (This listing can be implicit; the lookup table entry can describe the set of users indirectly, e.g., as the users whose nominal SINR is within a given range).
   d. Perform the joint scheduling/transmission algorithm over this user set using the real-time scheduling parameters from repositories. Transmission is performed from the set of antennas and with the transmit powers described by the lookup table entry with channel index f.
   e. Push to the repositories the information required for updating the real-time scheduling parameters of the user set considered for scheduling.

Although in general step 2d, i.e., the joint scheduling/transmission algorithm would be performed on every channel, the operations 2c and 2e above need not occur on every single use of the joint-scheduling algorithm.

Examples of Mapping Tables

The tables described below provide representative examples of mappings that show how controllers are allocated transmit antenna sites, transmit powers and user sets for scheduling. In all of the examples, it is assumed that groups of time-frequency slots are mapped into a set of "channels" in a periodically time-varying fashion. It is then assumed that the mapping provided in each example is used to determine on each such channel the transmit powers levels that would be used by each controller on this channel (group of time-frequency slots), the antenna sites controlled by each controller, and the subset of users out of which each controller will select the subset that it schedules in each instance. Specifically, within each channel, the mapping lists which antennas are controlled by the given controller, the total power available to that controller for signal transmission, and the subset of users over which the joint scheduling-transmission algorithm will be implemented.

For simplicity of illustration one-dimensional deployment examples are used in which, a finite number of antenna sites are uniformly spaced over a line segment that wraps around, i.e., the left end of the segment is viewed to be the same point as its right end. The M antenna sites are enumerated as $S_0, S_1, \ldots, S_{M-1}$. The left and right neighboring antenna sites to $S_i$ are sites $S_{i-1}$ and $S_{i+1}$, respectively, except when "i" is equal to 0 or to M−1. Specifically, due to the wrap-around nature of the configuration, the left and right neighbors of $S_0$ are sites $S_M$ and $S_1$, respectively, while the left and right neighbors of $S_{M-1}$ are sites $S_{M-2}$ and $S_0$, respectively.

Within any given channel, in principle there is loss in performance if there are users that are not allocated to any controller for scheduling. However, joint scheduling/MIMO transmission of smaller sets of users on any given controller can result in substantial reduction in complexity and in the overhead of required channel state information. This is especially true in the case that MU-MIMO is the MIMO transmission scheme employed. Furthermore, by carefully limiting the sets of users for scheduling over channels and space (or, signal-to-interference levels), and by carefully choosing the transmit power-level patterns over channels and controllers, high-performing systems can be designed, with much lower complexity overhead in coordination and in the scheduling/MIMO transmission algorithm.

One Antenna Site Per Controller

FIG. 4 illustrates a two-channel power/user scheduling allocation pattern for four controllers (C0, . . . , C3) controlling each of 4 antenna sites (S0, . . . , S3). Referring to FIG. 4, $U_i$ denotes all the users "associated" with antenna site $S_i$. For simplicity it is assumed that this association is distance-based (i.e., path-loss based). More generally, it can be based on large-scale signal-to-interference-plus-noise power ratios (SINRs). There are two subsets of $U_i$, namely the sets of users $U_{i,C}$, and $U_{i,E}$. The set $U_{i,C}$ corresponds to the subset of users that are sufficiently close to $S_i$ (and thus referred to herein as "center users"), while the set $U_{i,E}$ corresponds to the subset of users that are sufficiently far from $S_i$ (and thus referred to herein as "edge users"). Note that $U_{i,C}$ and $U_{i,E}$ can be overlapping sets (although in the figure these two sets are shown to be non-overlapping). At one extreme, $U_{i,E}$ may correspond, e.g., to the whole set $U_i$. Note also that, in general, the split between "center" and "edge" users may not be based on distance, but rather, nominal large-scale SINR levels. According to one such strategy, given a common nominal transmit power at all sites, any user in $U_i$ is included in the center group of a site if its average nominal large-scale SINR exceeds a certain threshold, while it is included in the edge group if its nominal SINR level is below a certain threshold.

Users in $U_{i,E}$ of even (odd) cells/controllers are served in channel 1 (channel 2), while users in $U_{i,C}$ are served in the complimentary channel. Note that the sets $U_{i,C}$ and $U_{i,E}$ may or may not be disjoint. For instance, in the case that $U_{i,E}=U_i$, but $U_{i,C} \subset U_i$, edge users can be scheduled on both channels, while center users can only be scheduled when the associated controller transmit power is low. Alternatively, in the case that $U_{i,C}=U_i$, but $U_{i,E} \subset U_i$, center users can be scheduled on both channels, while edge users can only be scheduled when the associated controller transmit power is high.

Table 1 contains a sample lookup table description for the example in FIG. 4. The lookup table provides a description of the joint transmit-antenna/transmit-power/user-set pattern allocation across controllers over two channels. In one embodiment, the channels correspond to distinct OFDM tones over the same OFDM block, or the same tone of distinct OFDM blocks. The transmit powers, $P_L$ and $P_H$, correspond to suitably preselected power levels that are chosen to optimize the rate allocation across center and edge users, subject to a total power constraint P, i.e., $(P_L+P_H)/2=P$. Note that in order to improve the rate provided to the edge users, $P_H$ and $P_L$ have to be chosen in such a way that the nominal SINR levels of the edge users are favorable (i.e., sufficiently large) during the slots (channels) that they are served. Since in those channels the signal power of the edge users can be improved by increasing $P_H$ and the interference power can be reduced by reducing $P_L$, to improve edge throughput over the case $P_H=P_L=P$, $P_H>P_L$. As a result, over any given channel, all edge users that are considered for scheduling are allocated high power levels while their closest interfering sites to the edge users are transmitting at low power. This unequal power allocation attempts improve the overall system fairness by balancing out the vast nominal SINR level differences between center and edge users that are present when equal transmit powers are used for transmission by all base stations.

In one embodiment, optimized ($P_H$, $P_L$) pairs are determined via offline optimization. $P_H$ and $P_L$ are the maximum transmit powers allowed for transmitting to edge and center users, respectively, and the base station of any given controller on any given channel. Allocation of that power among scheduled users is left to the scheduling algorithm in place.

TABLE 1

Example of joint transmit-antenna/transmit-power/user-set pattern allocation over two channels and four controllers

|  |  | Controller 0 | Controller 1 | Controller 2 | Controller 3 |
|---|---|---|---|---|---|
| Channel 1 | TX Antennas | $S_0$ | $S_1$ | $S_2$ | $S_3$ |
|  | TX Power | $P_H$ | $P_L$ | $P_H$ | $P_L$ |
|  | User Set | $U_{0,E}$ | $U_{1,C}$ | $U_{2,E}$ | $U_{3,C}$ |
| Channel 2 | TX Antennas | $S_0$ | $S_1$ | $S_2$ | $S_3$ |
|  | TX Power | $P_L$ | $P_H$ | $P_L$ | $P_H$ |
|  | User Set | $U_{0,C}$ | $U_{1,E}$ | $U_{2,C}$ | $U_{3,E}$ |

It is readily evident to a person skilled in the art that the above allocation readily generalizes to the case where F channels are employed with F>2. In particular, let $P_1, P_1, \ldots, P_F$, denote power levels such that $P_i<P_{i+1}$, and $(1/F) \Sigma_f P_f = P$. Let $\{U_{i,1}, U_{i,2}, \ldots, U_{i,F}\}$ denote subsets of set $U_i$, whose union is $U_i$. Furthermore, assume subsets $U_{i,1}$ and $U_{i,F}$ denote users at the "center" and at the "edge" of the cell, and assume that increasing f from f=1 to f=F, generates subsets $U_{i,f}$ that comprise users that are further and further from the antenna site $S_i$. Then Table 2 lists a generalized F-channel version of the previous two-channel example. Again the power allocation set $\{P_i\}$ would be determined via offline optimization.

TABLE 2

Generalization of the example shown in Table 1 to F channels (F > 2)

|  |  | Controller 0 | Controller 1 | Controller 2 | Controller 3 |
|---|---|---|---|---|---|
| Channel f | TX Antennas | $S_0$ | $S_1$ | $S_2$ | $S_3$ |
| 1 ≤ f ≤ F | TX Power | $P_{F+1-f}$ | $P_f$ | $P_{F+1-f}$ | $P_f$ |
|  | User Set | $U_{0,F+1-f}$ | $U_{1,f}$ | $U_{2,F+1-f}$ | $U_{3,f}$ |

Two (or More) Antenna Sites Per Controller

The following three representative examples involve wireless systems comprising a wrapped linear array with 8 transmit antenna sites and 4 controllers. In these cases, a single controller controls antennas at multiple (two in this case) antenna sites. Similarly to the original example, $U_{i,C}$ denotes the subset of users among those in $U_i$ that are the closest to the $S_i$'s. In this case, however, the "edge" user set is split into two sets: $U_{i,L}$ and $U_{i,R}$ ("left" and "right" edge group, respectively). Note again that, although, the groups have been split in terms of their distance and relative location with respect to $S_i$, more relevant large-scale signal-to-interference levels can be used for the user partitioning. For instance a user may be included in the "right" ("left") edge group by the controller, if its nominal aggregate interference levels from the right ("left") neighboring transmit antenna sites exceeds a certain threshold. Note also that a user may be included into multiple groups.

The first example of these cases, illustrated in FIG. 5, considers patterns where the antenna sites controlled by any controller remain unchanged over channels and is a natural extension of the example in FIG. 1. That is, FIG. 5 illustrates a three channel power/user scheduling allocation pattern associated with Table 2. Referring to FIG. 5, there are 4 controllers (C0, . . . , C3), each controlling 2 antenna sites (controller C3 and the sites S6 and S7 that it controls are not shown in the figure). There are 3 power levels: $P_1$, $P_2$, and $P_3$. Three sets of users are generated from the set of users $U_i$ that is associated with antenna site $S_i$: a set of "center" users ($U_{i,C}$) and a set of "left-edge" users ($U_{i,L}$), and a set of "right-edge" users ($U_{i,R}$). All "center" users are scheduled within Channel 3. All controllers are allocated the same transmit power ($P_3$) in that channel. Channels 1 and 2 serve users in edge sets. In these channels, the controller transmit-power allocations are varied between $P_1$ and $P_2$ (with $P_1 > P_2$), such that when the "odd" controllers use power $P_1$ ($P_2$) the even ones use power $P_2$ ($P_1$). Also, when a controller transmits at power $P_1$ ($P_2$), it serves edge-set users that are at the "edge" ("center") of its 2-cell cluster.

Table 3 provides a sample 3-channel transmit-site/transmit-power/user-set pattern assignment. The powers satisfy $(P_1+P_2+P_3)/3=P$, with $(P_1 > P_2)$, and in general would be determined offline.

TABLE 3

Example of joint transmit-antenna/transmit-power/
user-set pattern allocation over three channels and four
controllers, where each controller controls two antenna sites

|  |  | Controller 0 | Controller 1 | Controller 2 | Controller 3 |
|---|---|---|---|---|---|
| Channel 1 | TX Antennas | $S_0, S_1$ | $S_2, S_3$ | $S_4, S_5$ | $S_6, S_7$ |
|  | TX Power | $P_2$ | $P_1$ | $P_2$ | $P_1$ |
|  | User Set | $U_{0,C}, U_{1,C}$ | $U_{2,L}, U_{3,R}$ | $U_{4,C}, U_{5,C}$ | $U_{6,L}, U_{7,R}$ |
| Channel 2 | TX Antennas | $S_0, S_1$ | $S_2, S_3$ | $S_4, S_5$ | $S_6, S_7$ |
|  | TX Power | $P_1$ | $P_2$ | $P_1$ | $P_2$ |
|  | User Set | $U_{0,L}, U_{1,R}$ | $U_{2,C}, U_{3,C}$ | $U_{4,L}, U_{5,R}$ | $U_{6,C}, U_{7,C}$ |
| Channel 3 | TX Antennas | $S_0, S_1$ | $S_2, S_3$ | $S_4, S_5$ | $S_6, S_7$ |
|  | TX Power | $P_3$ | $P_3$ | $P_3$ | $P_3$ |
|  | User Set | $U_{0,R}, U_{1,L}$ | $U_{2,R}, U_{3,L}$ | $U_{4,R}, U_{5,L}$ | $U_{6,R}, U_{7,L}$ |

Figure 6:
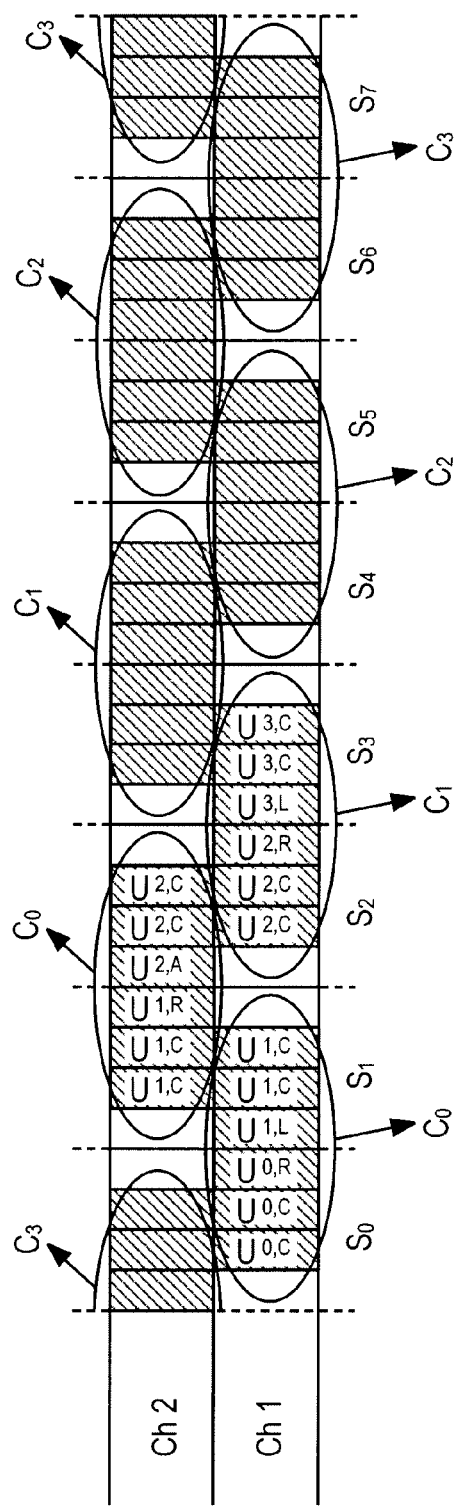
FIG. 6 illustrates a power/scheduling set allocation pattern over two channels.

The next two tables consider two examples whereby the antenna sites controlled by each controller change from channel to channel (alternatively, they may change over time). In the first example, illustrated in FIG. 6, the transmit power allocated to each controller remains unchanged from channel to channel. Referring to FIG. 6, each of the four controllers (C0, . . . , C3) controls 2 antenna sites within each channel. The antenna sites controlled by the controllers vary across the two channels. The transmit power remains unchanged from channel to channel. The set of users $U_i$ associated with antenna site $S_i$ is split between center users ($U_{i,C}$) and edge users ($U_{i,E}$); the "edge" user set is further split into two sets: $U_{i,L}$ and $U_{i,R}$ ("left" and "right" edge group, respectively). The line segment over which antenna sites are spaced wraps around. However, certain users may be considered for scheduling (by some controller) only on one of the channels while others may be considered for scheduling on multiple channels. This is the case for the center users (the users closest to an antenna site) in the example shown in Table 4. In this example, center users may be scheduled over the two channels while edge users are always scheduled on one channel. Notice, however, that scheduled edge-users are considered for scheduling when both neighboring antenna sites are controlled by their controller.

TABLE 4

Example of joint transmit-antenna/transmit-power/
user-set pattern allocation over two channels and
four controllers, where each controller controls two
antenna sites which can vary depending
on the channel used

|  |  | Controller 0 | Controller 1 | Controller 2 | Controller 3 |
|---|---|---|---|---|---|
| Ch 1 | TX Ant | $S_0, S_1$ | $S_2, S_3$ | $S_4, S_5$ | $S_6, S_7$ |
|  | TX Pow | P | P | P | P |
|  | User Set | $U_{0,C}, U_{0,R},$ $U_{1,L}, U_{1,C}$ | $U_{2,C}, U_{2,R},$ $U_{3,L}, U_{3,C}$ | $U_{4,C}, U_{4,R},$ $U_{5,L}, U_{5,C}$ | $U_{6,C}, U_{6,R},$ $U_{7,L}, U_{7,C}$ |
| Ch 2 | TX Ant | $S_1, S_2$ | $S_3, S_4$ | $S_5, S_6$ | $S_7, S_0$ |
|  | TX Pow | P | P | P | P |
|  | User Set | $U_{1,C}, U_{1,R},$ $U_{2,L}, U_{2,C}$ | $U_{3,C}, U_{3,R},$ $U_{4,L}, U_{4,C}$ | $U_{5,C}, U_{5,R},$ $U_{6,L}, U_{6,C}$ | $U_{7,C}, U_{7,R},$ $U_{0,L}, U_{0,C}$ |

Figure 7:
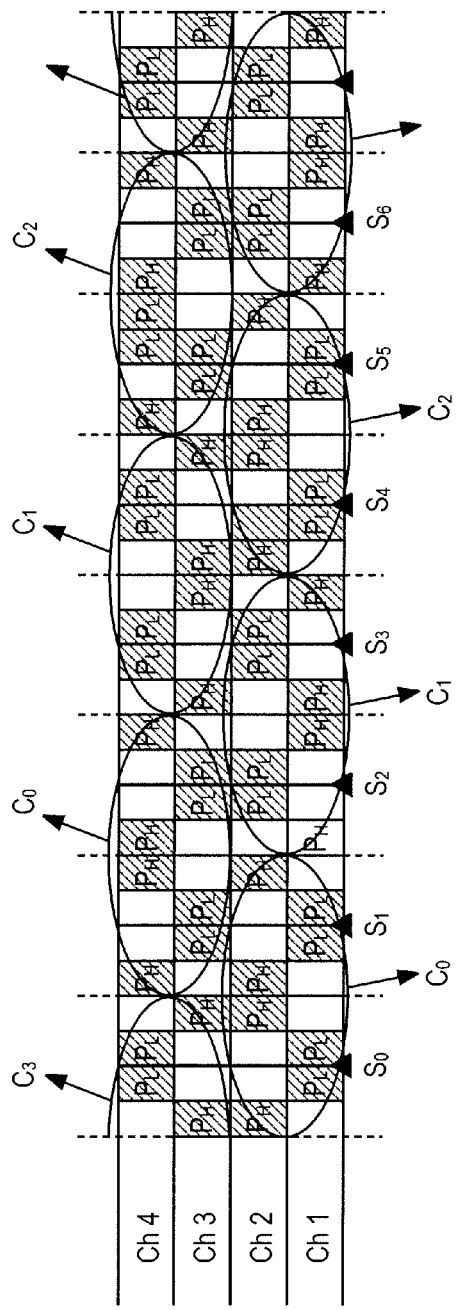
FIG. 7 illustrates a 4-channel power/user-set allocation pattern for 4 controllers.

In the final example, illustrated in FIG. 7, the transmit antenna sites, transmit power and user set to be scheduled by any given controller are all varied from channel to channel. Referring to FIG. 7, each of controllers, (C0, . . . , C3) controls 2 antenna sites, where the sites controlled by each controller and their transmit power levels vary across channels. As shown in FIG. 7, there are two distinct shifts and two power allocations per shift. The set of all combinations is described the four channel power/BS-to-controller associations shown in Table 5.

TABLE 5

Example of joint transmit-antenna/transmit-power/
user-set pattern allocation over four channels and
four controllers, where each controller controls two
antenna sites, and the antenna sites transmit power
and user sets vary from channel to channel

|  |  | Controller 0 | Controller 1 | Controller 2 | Controller 3 |
|---|---|---|---|---|---|
| Channel 1 | TX Antennas | $S_0, S_1$ | $S_2, S_3$ | $S_4, S_5$ | $S_6, S_7$ |
|  | TX Power | $P_L$ | $P_H$ | $P_L$ | $P_H$ |
|  | User Set | $U_{0,C}, U_{1,C}$ | $U_{2,E}, U_{3,E}$ | $U_{4,C}, U_{5,C}$ | $U_{6,E}, U_{7,E}$ |
| Channel 2 | TX Antennas | $S_0, S_1$ | $S_2, S_3$ | $S_4, S_5$ | $S_6, S_7$ |
|  | TX Power | $P_H$ | $P_L$ | $P_H$ | $P_L$ |
|  | User Set | $U_{0,E}, U_{1,E}$ | $U_{2,C}, U_{3,C}$ | $U_{4,E}, U_{5,E}$ | $U_{6,C}, U_{7,C}$ |
| Channel 3 | TX Antennas | $S_1, S_2$ | $S_3, S_4$ | $S_5, S_6$ | $S_7, S_0$ |
|  | TX Power | $P_L$ | $P_H$ | $P_L$ | $P_H$ |
|  | User Set | $U_{1,C}, U_{2,C}$ | $U_{3,E}, U_{4,E}$ | $U_{5,C}, U_{6,C}$ | $U_{7,E}, U_{0,E}$ |
| Channel 4 | TX Antennas | $S_1, S_2$ | $S_3, S_4$ | $S_5, S_6$ | $S_7, S_0$ |
|  | TX Power | $P_H$ | $P_L$ | $P_H$ | $P_L$ |
|  | User Set | $U_{1,E}, U_{2,E}$ | $U_{3,C}, U_{4,C}$ | $U_{5,E}, U_{6,E}$ | $U_{7,C}, U_{0,C}$ |

Other Extensions

There are a number of straightforward extensions of the pattern allocations described here. For instance, although only a two-level transmit power granularity is considered in Table 5, the approach can be readily extended to an F-level granularity for F>2. Note that, in general, no strict rules are set for choosing the power allocation. Although the preceding examples seem to suggest that when the highest power levels are used at one controller the lowest power levels are used at its neighboring controllers, the power allocation patterns generated offline need not conform to this suggestion.

Figure 10:
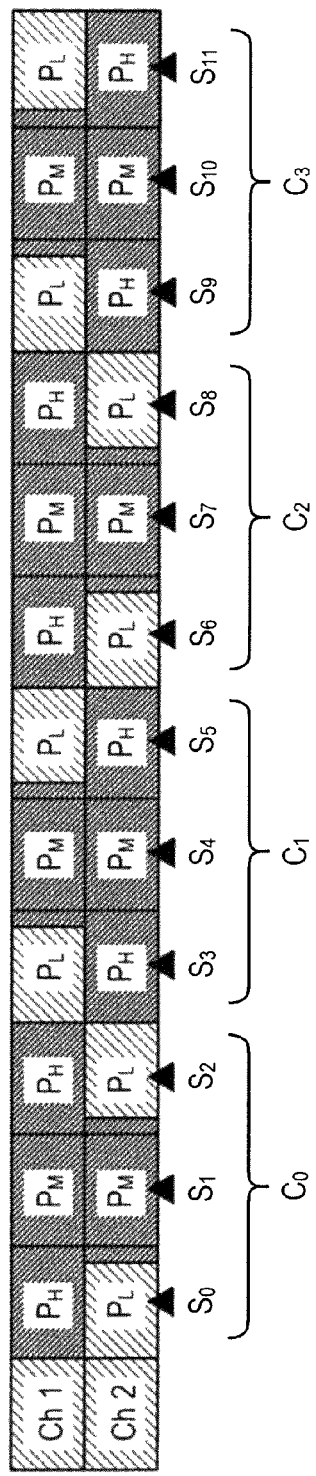
FIGS. 10-12 illustrate examples of transmit power patterns.
Figure 11:
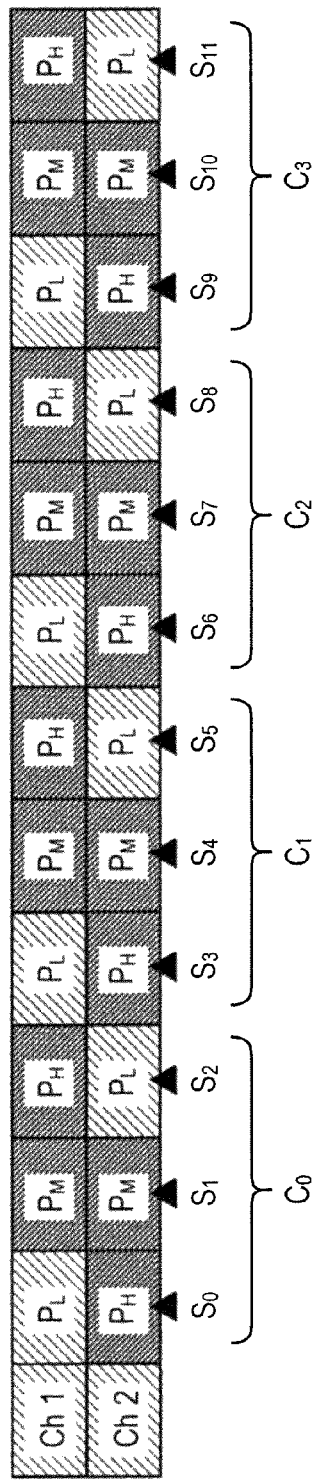
Figure 12:
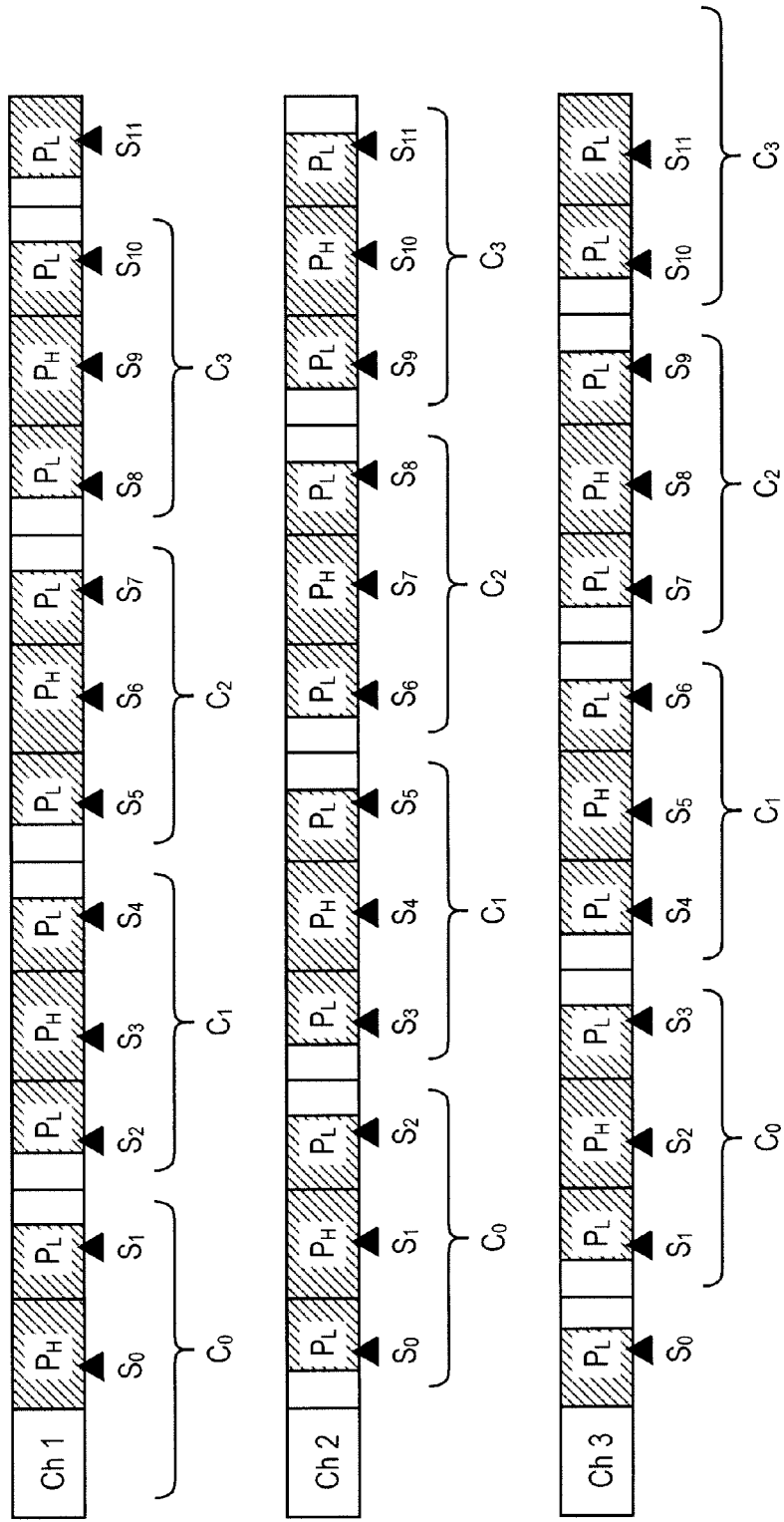

In addition, in the example of Table 5, each controller controls only two antenna sites at a time, and oscillates between controlling only two patterns. More antenna sites can be controlled at any time and the controller can be assigned to control many more subsets of antenna sites. FIGS. 10, 11, and 12 show such examples with clusters of size 3. The controllers are designated $C_0$-$C_3$ and the base stations are designated $S_0$-$S_{11}$. In the embodiment shown in FIG. 10, two channels are employed. Each controller is associated with the same set of base stations over both channels. The center base station in each cluster always transmits at power $P_M$. The edge base stations in each cluster transmit at power $P_L$ over one channel and at power $P_H$ over the other channel. Furthermore, given the edge base stations of a cluster at a given channel (1 or 2) transmit at power $P_H$, the edge base stations of the two neighboring clusters in the same channel are set to transmit at power $P_L$. As a result, assuming $P_H$>$P_L$, the coverage in each cluster varies from channel 1 and channel 2. The shaded regions in the figure are meant to qualitatively suggest how the coverage areas over which users are scheduled vary over channel and cluster. Specifically, darker areas within a channel suggest a higher likelihood for users in the given location for being scheduled on that channel, while lighter-shade regions suggest reduced likelihood for scheduling for users in these areas.

FIG. 11 shows another embodiment, which is a variation of the example depicted in FIG. 10. Again each controller is associated with the same set of base stations over both channels and the center base station in each cluster always transmits at power $P_M$. Furthermore, given the power of the left edge base station of a cluster at a given channel (1 or 2) equals $P_H$, the power of the right edge base station of the neighboring cluster to the left is set to $P_L$ over the same channel. Similarly to FIG. 10, the shaded regions in the figure are meant to qualitatively suggest how the coverage areas over which users are scheduled vary over channel and cluster, assuming $P_H$>$P_L$.

FIG. 12 shows another related embodiment involving 3 channels with clusters of size three. The clusters are varied over the three channels (implementing a full shift system). Within each channel, the center base station transmits at power $P_M$ while the edge base stations transmit at power $P_L$.

Related embodiments involving two dimensional cellular layouts can be readily designed. In one embodiment involving a two dimensional hexagonal-type cell configuration, each controller controls 7 antenna sites at a time. Consider first the static antenna assignment case whereby the association between controllers and antenna sites is fixed, and where each controller controls a "center" site and its six neighboring sites. If a total of F distinct power-level patterns are employed across controllers, a total of F channels could be employed to depict the associated pattern allocations. More dynamic settings may be considered in which each controller/transmit antenna site association changes over channels. For instance, each controller may oscillate between 7 possible "7-transmit antenna site" cluster configurations, whereby the central antenna site in the cluster controlled by the controller is periodically varied among a given site and its 6 first-tier neighbors. In that case, assuming that for each antenna-site/controller assignment, F distinct power-level patterns are employed across controllers, a total of 7F channels could be employed to depict the associated pattern allocations. As in the preceding cases, the lookup table parameters for the 7F channels could be generated offline.

The scheduling of users is performed jointly over channels (or coordination patterns). While assigning disjoint sets of users to different controllers over any given channel, each scheduling algorithm is run independently on each controller. The rates of the users across the multicell deployments can still be coupled, however, even though each controller schedules users independently of others within any given channel. Specifically, if deployments are used where on different channels a given user is assigned to different controllers, the scheduling of users is indirectly coupled across controllers. In these cases, even though user selection is conducted independently within each channel and for a given controller, there is information shared across channels (or coordination patterns) and this information is exploited by the controller to update parameters used in the user selection of each of its channels. The information can be the weight associated to each user, when a user was last scheduled, and/or other pertinent scheduling parameters.

Figure 8:
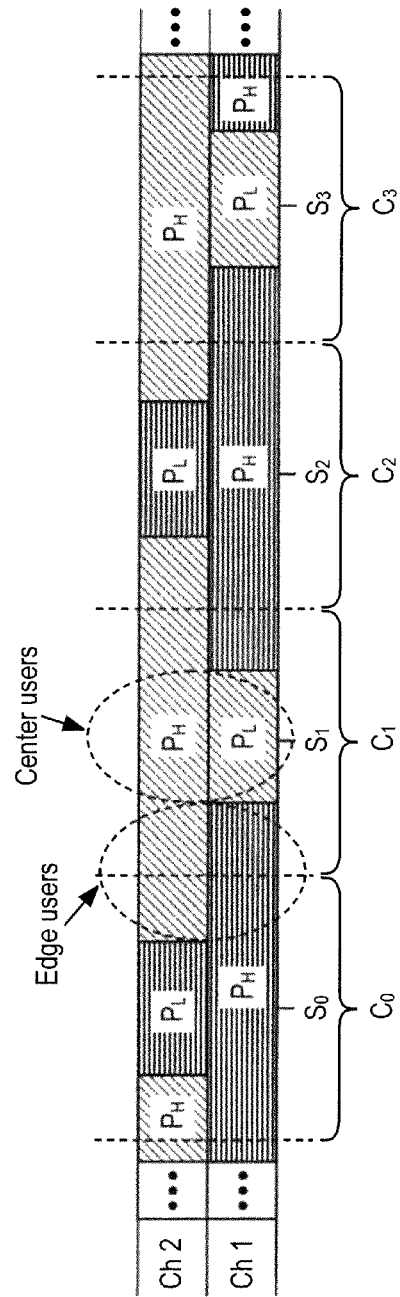
FIG. 8 illustrates a power allocation pattern for a sequence of controllers.

The coupling between rates of users across the multi-cell deployment can occur even in the case that there is a static assignment of transmit-antennas to the controllers. For instance, such user-rate coupling can be induced by using varying transmit power-level patterns across controllers and by judiciously associating (for scheduling), e.g., "edge" users with different controllers over different channels. One such example is illustrated in FIG. 8. The antenna-to-controller association is the same as in the example of FIG. 4. Referring to FIG. 8, each of controllers $C_n$, (where only $C_0, \ldots, C_3$ are shown), controls one antenna site, $S_n$. The power levels used by each controller are varied over two channels between a low power ($P_L$) and a high power ($P_H$). In the figure, "center" users (i.e., users sufficiently close to an antenna site, or users with sufficiently high nominal SINR) are always served by the same controller, whereas "edge" users (i.e., users sufficiently far from their nearest antenna site) are served by the controller controlling the nearest antenna site transmitting at high power.

The power per controller of FIG. 8 is varied between a low power and a high power, exactly like in FIG. 4. However, the users association to controllers is different in FIG. 8 from that in FIG. 4. First, within any given channel, in the method depicted in FIG. 8 every single user is associated to a controller for scheduling, while that is not necessarily true in the method of FIG. 4 (this is only true in FIG. 4 if $U_{i,C}$=$U_{i,E}$=$U_i$). There is, however, a more important difference between the two examples. In particular, in the method of FIG. 4, each user is associated with the same controller for scheduling (the users in sets $U_{i,C}$, $U_{i,E}$, are associated with controller $C_i$), while in FIG. 8 a user may be associated with a different controller within each channel. Extensions similar to that in FIG. 8 can also be constructed for all the examples in FIGS. 5-7. And more generally, in practical deployments, it may also be the case that within any given channel, a user is assigned into the scheduling set of none, one, or more than one controllers, and that this association changes from channel to channel for each user.

Advantages of Embodiments of the Invention

Embodiments of the present invention enable the design of low-complexity readily scalable high-performance methods for joint scheduling/MIMO transmission algorithms for downlink multicell deployments. In particular, a priori design of jointly time-frequency varying patterns of controlled antenna sites, transmit power limits, and user sets to be scheduled can yield MIMO deployments with high sum rates and improved throughputs for users at the cell edges. Elements of one embodiment that make these system designs attractive include:

1. A set of controllers, each of which may control one of multiple antenna sites, each with one or more antennas.
2. A coded MIMO/OFDM transceiver, along with a family of codes and coding rates. Given a rate for a scheduled user, a code and a coding rate are selected for this particular user and are used to encode a segment of the information-bearing signal for that user. In one embodiment, the resulting signals for all users are summed up and transmitted via OFDM.
3. A split of the frequency (OFDM tones)/time (OFDM blocks) and space into channels.
4. A map/lookup table that is jointly used by all controllers, and whose entries are cycled through in unison by all controllers. The map lists resource allocations over a set of "channels", which are synchronously visited (or, synchronously cycled through) by all controllers. In one embodiment, each channel entry provides for each controller the following: (a) the transmit antenna sites that this controller controls (and will thus schedule transmissions) within this channel; (b) the total transmit power to be used by each base station controlled by this controller on this channel; (c) the set of users over which the scheduling/MIMO preceding algorithm is to be performed by the controller; (d) other pertinent information such as, e.g., the duty cycle of each channel.
5. A mapping of time-frequency slots into virtual channels. To determine what is transmitted within any time-frequency slot, the slot (or a set of slots) is first mapped into a virtual channel entry. Then all controllers choose their resource allocation parameters according to what is listed for them on that channel entry in the map.
6. A joint scheduling/MIMO transmission algorithm implemented at each controller separately. In one embodiment, given to the controller are the following: (a) a transmit power constraint at the controller; (b) a set of users (from which the controller will choose a scheduled set), (c) the user "weights", i.e., the factor by which each users' rate will be weighed in scheduling/optimization criterion; (d) the required channel parameters between the antennas controlled by the given controller and the antennas of each user; (e) the aggregate interference level at each user. The controller then uses a joint scheduling/MIMO transmission algorithm comprising a scheduling algorithm (e.g., a proportional fair-scheduling algorithm), together with a MIMO transmission scheme. In one embodiment, the MIMO transmission scheme is either a SU-MIMO algorithm or a multiuser preceding algorithm (i.e., block zero-forcing precoder). The scheduling algorithm runs on top of the coordinated patterns. This algorithm results in a subset of users (along with the associated rates) that are to be served within the given channel by the given controller. The algorithm also generates the associated parameters for the MIMO transmission scheme. In one embodiment, these include the channel coding parameters, the number of streams per user, and, potentially (e.g., in the case of multiuser MIMO, or closed loop SU-MIMO) the associated preceding matrix. Then the strategy listed in item 2 is used for transmission, and the scheduling parameters of the users are appropriately updated.

One advantage of embodiments of the invention is that it allows interference management and mitigation for achieving high-sum rates and high edge throughputs, while maintaining the simplicity of schemes that do not employ multi-cell coordination. In particular, over any given channel each controller runs its own scheduling/MIMO transmission algorithm, as is the case in the uncoordinated case. However, by using a coordinated pattern of controlled antenna sites, transmit power profiles, and user sets for scheduling, significant improvements can be obtained in terms of sum-rates and edge-rates without significant increase in complexity. The resulting schemes are also readily scalable in: (a) number of antenna sites following the map; (b) number of antenna sites controlled by each controller, (c) number of antennas per site; (d) receive antennas per user; (d) granularity in the transmit power profile.

An Example of a Base Station

Figure 9:
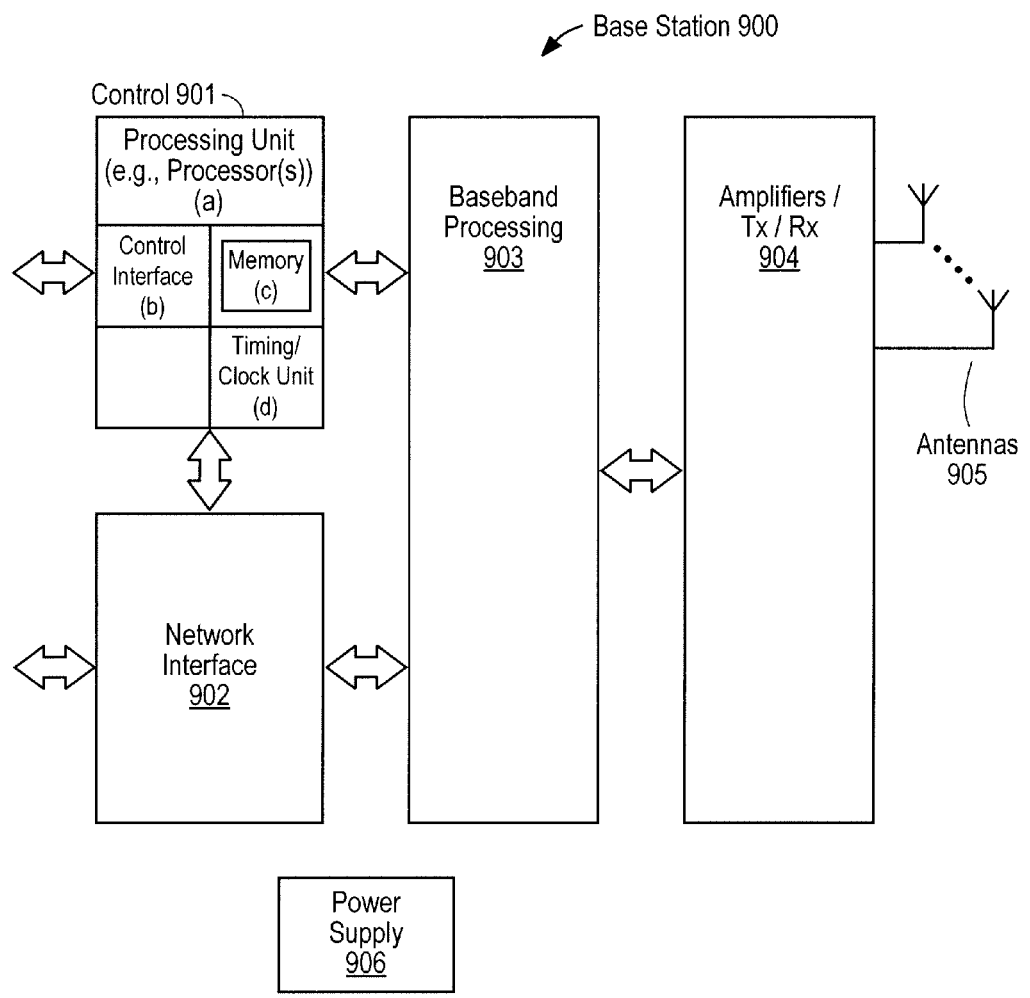
FIG. 9 is a block diagram of one embodiment of a base station.

FIG. 9 is a block diagram of one embodiment of a base station that performs one or more of the functions described above. Referring to FIG. 9, the base station 900 includes a control 901 coupled to a network interface 902 and baseband processing 903. Baseband processing 903 is also coupled to network interface 902 and amplifiers/Tx/Rx 904, which comprises the transmitter(s) and receiver(s) of the base station, along with their amplifiers, and these are coupled to antennas 905. These operate in a manner well-known in the art. A power supply 906 also provides power to components of base station 900. [Comment: I'm not sure if this a relevant comment, but it seems to me that the example such match some of the embodiments in this patent. All embodiments concern cases where transmission happens jointly from at least two distinct locations. If there is one base station per location, that means transmission JOINTLY happens from multiple base-stations (i.e., one entity collects all channel info, does scheduling and decides what all the base station in the cluster will jointly transmit).

Control 901 includes a control interface 901(*b*) to send and receive control information, such as, for example, information specifying coordination patterns and/or information to control other base stations or antenna controllers. Processor(s) 901(*a*) control, or cause to be controlled, many of the base station's operations (or operations of other base stations), including changes in coordination patterns.

In one embodiment, processor 901(*a*) operates as a controller to collect all channel information, perform scheduling and determining which base stations in the cluster will jointly transmit with each other. (Note that alternatively these control functions could be implemented in a device outside of a base station and control all base stations in one (or more) clusters.)

Memory 901(*c*) stores instructions to perform the functions described herein and other data, along with pre-defined coordination patterns, such as those described above. In one embodiment, memory 901(*c*) stores one or more lookup tables as described above. A timing/clock unit 901(*d*) provides timing and/or clocking for the base station, in a manner well-known in the art.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use in a wireless communication system having a plurality of cells and transmitting wireless signals using MIMO transmission, the method comprising:

varying transmit power coordination patterns for base stations in the wireless communication system to jointly vary base station transmit power over a set of virtual channels over base stations within a cluster and across clusters of base stations, wherein at least two virtual channels are employed by each cluster of base stations, wherein center base stations in each cluster transmit at a first power level for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels; and jointly transmitting by groups of the base stations to one or more user terminals in their respective clusters based on the transmit power coordination patterns.

2. The method defined in claim 1 wherein each virtual channel comprises one selected from a group of transmission resources consisting of a frequency sub-band, a set of time slots, a set of time-frequency slots, and a set of spreading codes.

3. The method defined in claim 1 wherein varying transmit power coordination patterns comprises assigning a transmit power pattern to each cluster of base stations in a manner to cause base stations at edges of each cluster to transmit over at least one of the set of virtual channels at different power levels than a previously assigned transmit power pattern.

4. The method defined in claim 1 wherein varying transmit power coordination patterns comprises assigning a transmit power pattern to each cluster of base stations in a manner to cause base stations centrally located in the clusters, base stations that are not at the edge of a cluster, or base stations surrounded by stations in their own cluster to transmit at identical power levels.

5. The method defined in claim 1 wherein different transmit power coordination patterns specify different clusters of base stations.

6. The method defined in claim 5 wherein the transmit power levels for a least two base stations in one cluster for at least one virtual channel are different but the transmit power levels for the plurality of virtual channels for a plurality of clusters are identical.

7. The method defined in claim 1 wherein varying transmit power coordination patterns comprises assigning all base stations in each cluster a plurality of virtual channels by which to transmit and a set of power levels to be used for transmission, such that transmissions on each virtual channel are at one power level in the set of power levels.

8. The method defined in claim 7 wherein each transmit power coordination pattern assigns an individual power level to each base station in the cluster for each virtual channel.

9. The method defined in claim 8 wherein base stations within a cluster are not assigned identical transmit power levels for at least one of the set of virtual channels.

10. The method defined in claim 1, wherein the at least two virtual channels comprises two virtual channels, and the center base stations in each cluster transmit at a medium power level for the two virtual channels, edge base stations in each cluster transmit at a low power level for a first channel of the two virtual channels, and edge base stations in each cluster transmit at a high power level for a second channel of the two virtual channels, wherein edge base stations of adjacent clusters of base stations transmit at opposite power levels for corresponding virtual channels, and wherein the medium power level is less than the high power level, and the low power level is less than the medium power level.

11. A method for use in a wireless communication system having a plurality of cells and transmitting wireless signals using MIMO transmission, the method comprising:

dividing a set of channels over time and frequency that are used by a first cluster of adjacent base stations which operate together as a single distributed multi-antenna transmitter, the set of channels being divided into subchannels;

allocating power for transmission to each base station in the first cluster over the subchannels in a non-uniform pattern, jointly with a second cluster adjacent to the first cluster, wherein at least two virtual channels are employed by each cluster of base stations, wherein center base stations in each cluster transmit at different first power levels for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels;

scheduling transmissions for base stations in the first cluster; and jointly transmitting from base stations in the first cluster to one or more user terminals, including transmitting wireless signals from each base station in the cluster where the transmit power levels are varied on each base station and each subchannel, while jointly and simultaneously transmitting from base stations in the second cluster.

12. The method defined in claim 11 wherein each channel comprises one selected from a group of transmission resources consisting of a frequency sub-band, a set of time slots, a set of time-frequency slots and a set of spreading codes.

13. The method defined in claim 11 wherein allocating power for transmission to each base station in the first cluster over the subchannels in a non-uniform pattern jointly with a second cluster adjacent the first cluster comprises allocating transmit power levels to vary transmit power coordination patterns among at least the first and second clusters by assigning a transmit power pattern to each cluster of base stations in a manner to cause base stations at edges of each cluster to transmit over at least one of the subchannels at different power levels.

14. The method defined in claim 11 wherein allocating power for transmission to each base station in the first cluster over the subchannels in a non-uniform pattern jointly with a second cluster adjacent the first cluster comprises allocating transmit power levels to vary transmit power coordination patterns among at least the first and second clusters by assigning a transmit power pattern to each cluster of base stations in a manner to cause base stations centrally located in the clusters or base stations not at the edges of the cluster to transmit at identical power levels.

15. The method defined in claim 11 wherein power levels are jointly coordinated in the first cluster and all the neighboring (interfering) clusters of base stations.

16. The method defined in claim 11 further comprising:

shifting a number of base stations into different clusters that each operate together as a single distributed multi-antenna transmitter; and reassigning transmit power coordination patterns to each of the different clusters.

17. The method defined in claim 16 wherein the transmit power coordination patterns vary which base stations are clustered in the different clusters over the subchannels.

18. The method defined in claim 17 wherein the transmit power levels for a least two base stations in one cluster for at least one virtual channel are different but the transmit power levels for the plurality of virtual channels for a plurality of clusters are identical.

19. An article of manufacture having one or more recordable storage media storing instruction thereon which when executed by a system cause the system to perform a method for use in a wireless communication system having a plurality of cells and transmitting wireless signals using MIMO transmission, the method comprising:
  varying transmit power coordination patterns for base stations in the wireless communication system to jointly vary base station power over a set of virtual channels over base stations within a cluster and across clusters of base stations, wherein at least two virtual channels are employed by each cluster of base stations, wherein center base stations in each cluster transmit at a first power level for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels; and
  jointly transmitting by groups of the base stations to one or more user terminals in their respective clusters based on the transmit power coordination patterns.

20. An article of manufacture having one or more recordable storage media storing instruction thereon which when executed by a system cause the system to perform a method for use in a wireless communication system having a plurality of cells and transmitting wireless signals using MIMO transmission, the method comprising:
  dividing a set of channels over time and frequency that are used by a first cluster of adjacent base stations which operate together as a single distributed multi-antenna transmitter, the set of channels being divided into subchannels;
  allocating power for transmission to each base station in the first cluster over the subchannels in a non-uniform pattern, jointly with a second cluster adjacent to the first cluster, wherein at least two virtual channels are employed by each cluster of base stations, wherein center base stations in each cluster transmit at different first power levels for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels;
  scheduling transmissions for base stations in the first cluster; and
  jointly transmitting from base stations in the first cluster to one or more user terminals, including transmitting wireless signals from each base station in the cluster where the transmit power levels are varied on each base station and each subchannel, while jointly and simultaneously transmitting from base stations in the second cluster.

21. A base station for use in a cell of a wireless communication system having a plurality of cells, the base station comprising:
  a transmitter;
  a memory to store a power coordination pattern that specifies an allocation of transmit power levels for transmission on a plurality of virtual channels including transmit power levels for the transmitter, where the transmit power levels are jointly allocated over base stations within individual clusters and across clusters of base stations, wherein at least two virtual channels are employed by each cluster of base stations, wherein center base stations in each cluster transmit at a first power level for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels; and
  a controller, coupled to the memory and the transmitter, responsive to the power coordination pattern being varied, to cause the transmitter to base stations to transmit to one or more user terminals based on the transmit power level specified in the power coordination pattern.

22. The base station defined in claim 21 wherein each coordination patterns specifies base stations that are to coordinate together in their transmissions for each cluster.

23. The base station defined in claim 21 wherein the power coordination pattern specifies a transmit power pattern that specifies at least one virtual channel on which at least two of base stations within a cluster containing the base station transmit at different power levels, that is not identical to transmit power coordination patterns of adjacent clusters.

24. A wireless communication system comprising:
  a plurality of user terminals;
  a plurality of a base stations;
  a memory to store a set of power coordination patterns that each specifies an allocation of transmit power levels for transmission on a plurality of virtual channels, where the transmit power levels are jointly allocated over base stations within individual clusters and across clusters of base stations, wherein at least two virtual channels are employed by each cluster of base stations, wherein center base stations in each cluster transmit at a first power level for each of the at least two virtual channels, edge base stations in each cluster transmit at a second power level, different than the first power level, for a first channel of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels; and
  a control to vary the set of predefined power coordination patterns that is used by the plurality of base stations.

25. The system defined in claim 24 wherein each power coordination pattern specifies each subchannel has one transmit power pattern within a cluster.

26. The system defined in claim 24 wherein each power coordination pattern specifies distinct clusters and a distinct per-base station power pattern for use on each subchannel.

27. The system defined in claim 24 wherein each coordination pattern indicates which base stations are to coordinate together in their transmissions for each cluster.

28. A method comprising:

mapping transmission resources to virtual channels, where each virtual channel represents a distinct coordination pattern defined by the clusters of neighboring base stations and per-base station transmit powers allocated for transmission, wherein at least two virtual channels are employed by each cluster of base stations, wherein center base stations in each cluster transmit at a first power level for each of the at least two virtual channels, edge base stations in each cluster transmit at a second power level, different than the first power level, for one of the at least two virtual channels, and edge base stations in each cluster transmit at a third power level, different from the first and second power levels, for another of the at least two virtual channels, wherein edge base stations of adjacent clusters of base stations transmit at different power levels for corresponding virtual channels; and scheduling and performing transmissions for each cluster independently of each other.

* * * * *